United States Patent
Raghavan et al.

(10) Patent No.: US 11,895,058 B2
(45) Date of Patent: Feb. 6, 2024

(54) METHODS FOR SCHEDULING OFFSET DETERMINATION IN ULTRA WIDE BANDWIDTH BEAMFORMING SYSTEMS

(71) Applicant: QUALCOMM Incorporated, San Diego, CA (US)

(72) Inventors: Vasanthan Raghavan, West Windsor Township, NJ (US); Xiaoxia Zhang, San Diego, CA (US); Srinivas Yerramalli, San Diego, CA (US); Tao Luo, San Diego, CA (US); Arumugam Chendamarai Kannan, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/398,843

(22) Filed: Aug. 10, 2021

(65) Prior Publication Data
US 2022/0077998 A1  Mar. 10, 2022

Related U.S. Application Data

(60) Provisional application No. 63/074,701, filed on Sep. 4, 2020.

(51) Int. Cl.
*H04L 5/00*  (2006.01)
*H04W 72/1273*  (2023.01)
*H04W 72/23*  (2023.01)

(52) U.S. Cl.
CPC .......... *H04L 5/0098* (2013.01); *H04L 5/0026* (2013.01); *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0236692 A1* | 7/2020 | Lin | H04W 72/0446 |
| 2020/0351011 A1 | 11/2020 | Mukherjee | |
| 2021/0184824 A1* | 6/2021 | Kwak | H04L 5/0094 |

(Continued)

OTHER PUBLICATIONS

International Search Report and Written Opinion—PCT/US2021/045583—ISA/EPO—dated Jan. 24, 2022.

(Continued)

*Primary Examiner* — Phirin Sam
(74) *Attorney, Agent, or Firm* — QUALCOMM Incorporated

(57) ABSTRACT

Aspects presented herein may enhance the configuration of the scheduling offset for communication devices within a channelized frequency band. In one aspect, a UE receives a PDCCH including a scheduling offset parameter. The PDCCH schedules one of a PDSCH for reception in a first sub-band within a BWP or provides an uplink scheduling grant of a PUSCH for transmission in a second sub-band within the BWP. The UE communicates with a base station based on one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a PUCCH is used to schedule the PUSCH.

28 Claims, 15 Drawing Sheets

(56) References Cited

U.S. PATENT DOCUMENTS

| | | | | |
|---|---|---|---|---|
| 2022/0338120 A1* | 10/2022 | Ma | ............... | H04W 72/0446 |
| 2023/0171791 A1* | 6/2023 | Fujishiro | ............ | H04W 4/06 |
| | | | | 370/312 |
| 2023/0179354 A1* | 6/2023 | Muruganathan | ...... | H04L 5/0023 |
| | | | | 370/329 |
| 2023/0262599 A1* | 8/2023 | Jung | ............... | H04L 5/0007 |
| | | | | 370/311 |

OTHER PUBLICATIONS

Huawei, et al., "DCI Contents and Formats in NR", 3GPP Draft, 3GPP TSG RAN WG1 Meeting #90bis, R1-1717064, 3rd Generation Partnership Project (3GPP), Mobile Competence Centre, 650, Route Des Lucioles, F-06921 Sophia-Anti Polis Cedex, France, vol. RAN WG1, No. Prague, Czech Republic, Oct. 9, 2017-Oct. 13, 2017 Oct. 8, 2017 (Oct. 8, 2017), XP051340255, 10 Pages, Retrieved from the Internet: URL: http://www.3gpp.org/ftp/Meetings_3GPP_SYNC/RAN1/Docs/ [retrieved on Oct. 8, 2017] Section 2 Table 1.
Partial International Search Report—PCT/US2021/045583—ISA/EPO—dated Nov. 24, 2021.

* cited by examiner

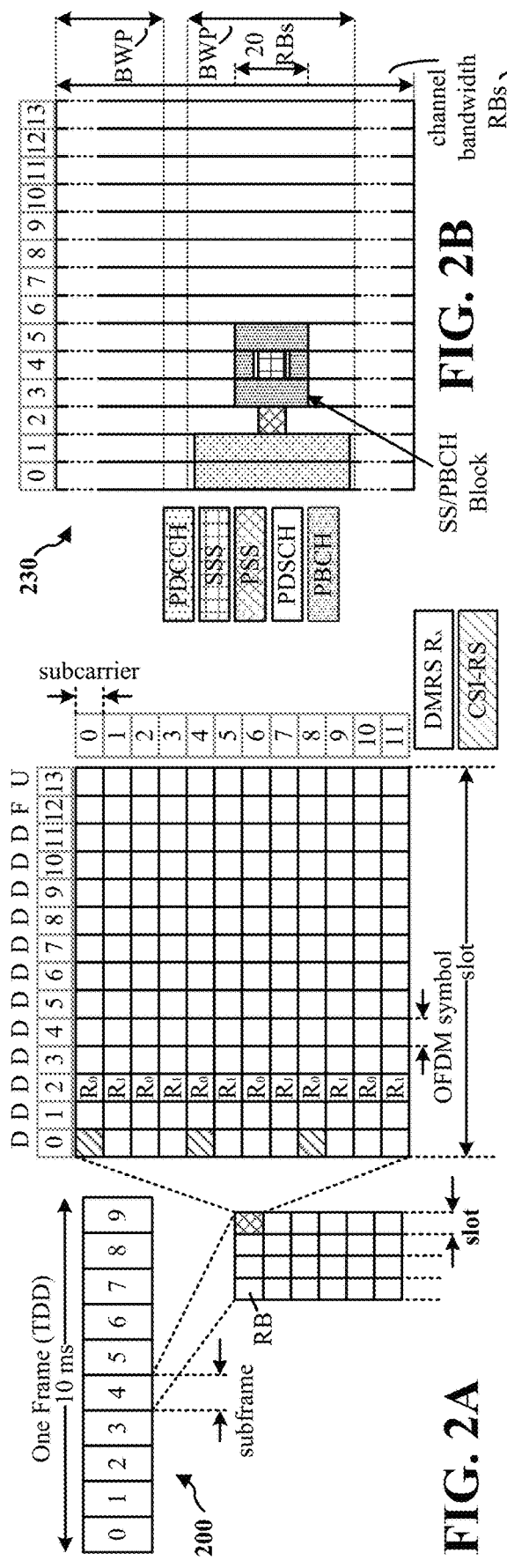
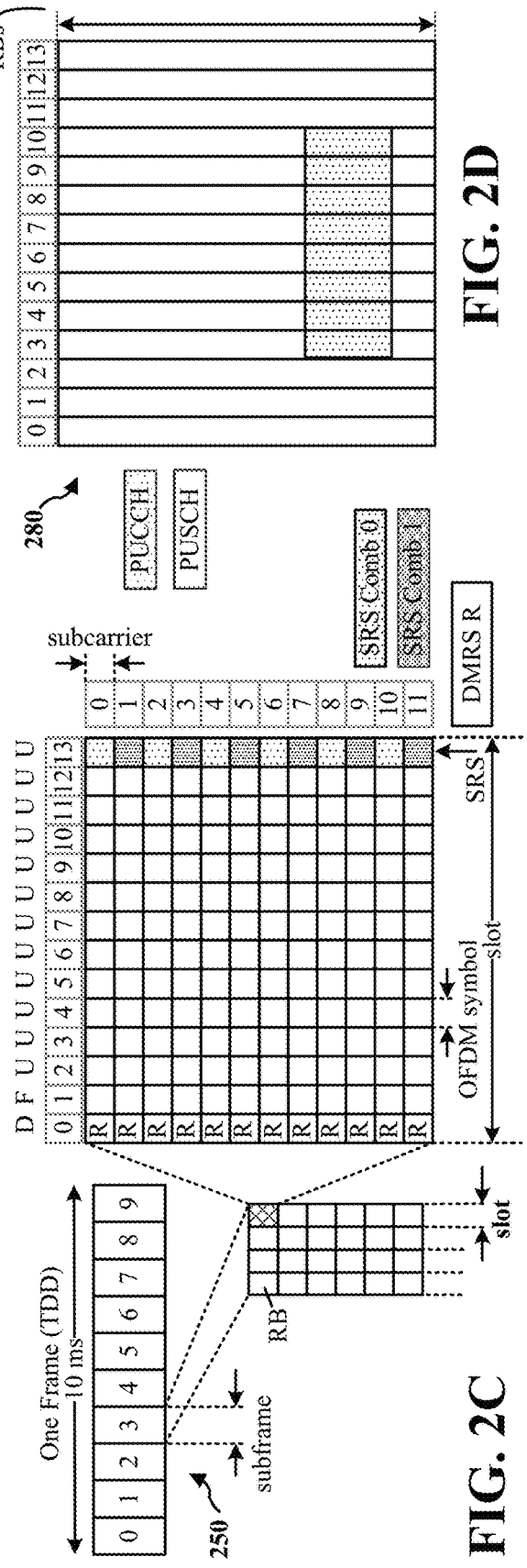
FIG. 2A  FIG. 2B  FIG. 2C  FIG. 2D

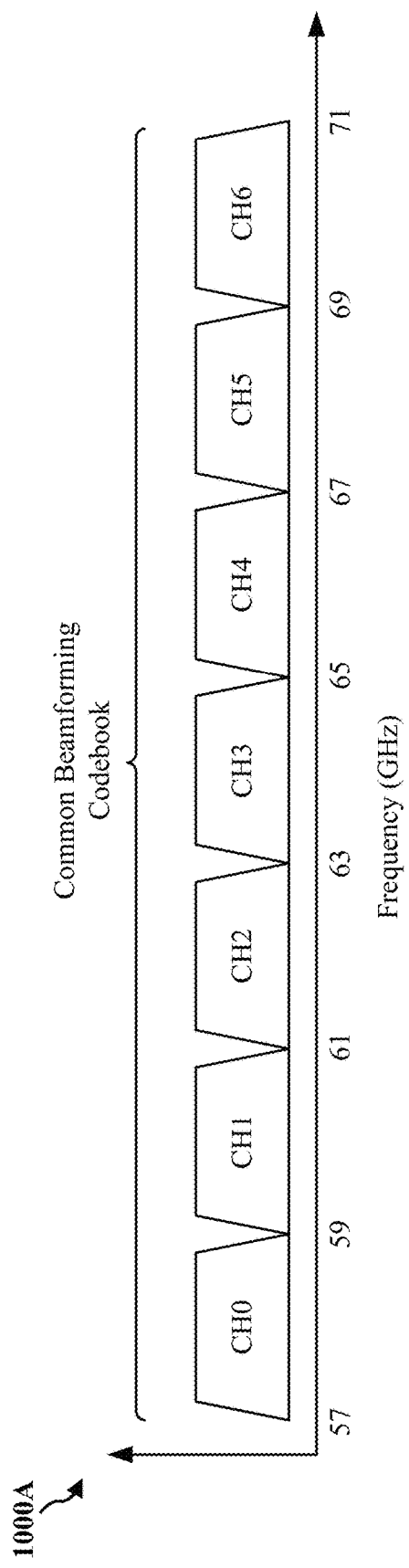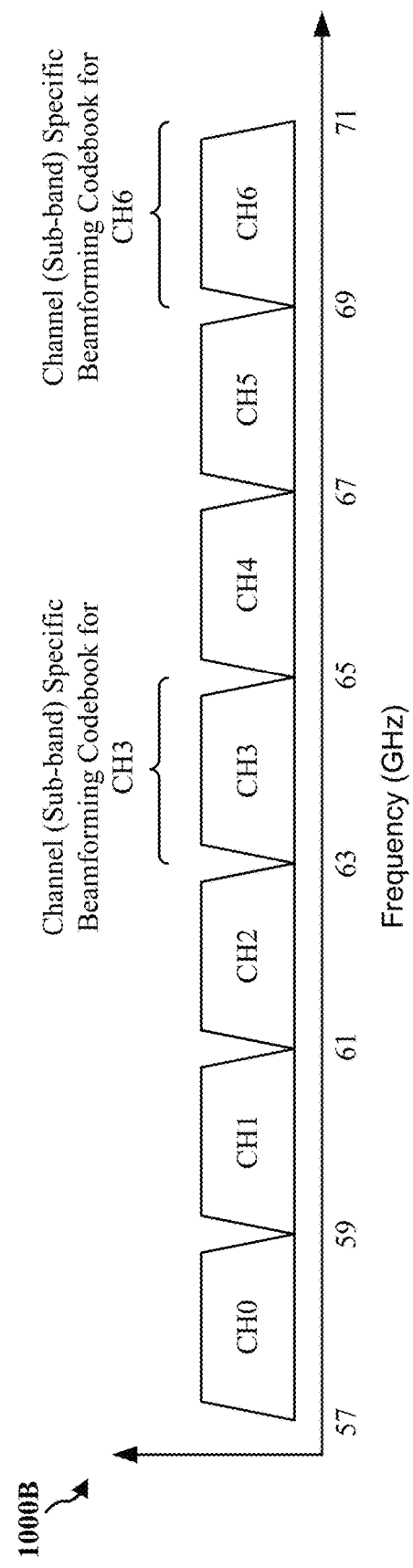

METHODS FOR SCHEDULING OFFSET DETERMINATION IN ULTRA WIDE BANDWIDTH BEAMFORMING SYSTEMS

CROSS REFERENCE TO RELATED APPLICATION(S)

This application claims the benefit of priority of Provisional Application Ser. No. 63/074,701, entitled "METHODS FOR SCHEDULING OFFSET DETERMINATION IN ULTRA WIDE BANDWIDTH BEAMFORMING SYSTEMS" and filed on Sep. 4, 2020, which is expressly incorporated by reference herein in its entirety.

TECHNICAL FIELD

The present disclosure relates generally to communication systems, and more particularly, to wireless communication involving scheduling offset in beamforming systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP. The apparatus communicates with a base station based on one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a physical uplink control channel (PUCCH) is used to schedule the PUSCH.

In an aspect of the disclosure, a method, a computer-readable medium, and an apparatus are provided for wireless communication at a base station. The apparatus transmits a PDCCH comprising a scheduling offset parameter, where the PDCCH schedules one of a PDSCH for a UE to receive in a first sub-band within a BWP or provides an uplink scheduling grant of a PUSCH for the UE to transmit in a second sub-band within the BWP. The apparatus communicates with the UE in one of a slot for transmitting the PDSCH based on the first sub-band within the BWP and the scheduling offset parameter if the PDCCH schedules the PDSCH, or a slot for receiving the PUSCH based on the second sub-band within the BWP and the scheduling offset parameter if a PUCCH is used to schedule the PUSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

FIGS. 10A and 10B are diagrams illustrating examples of beamforming codebook in accordance with various aspects of the present disclosure.

DETAILED DESCRIPTION

Figure 1:
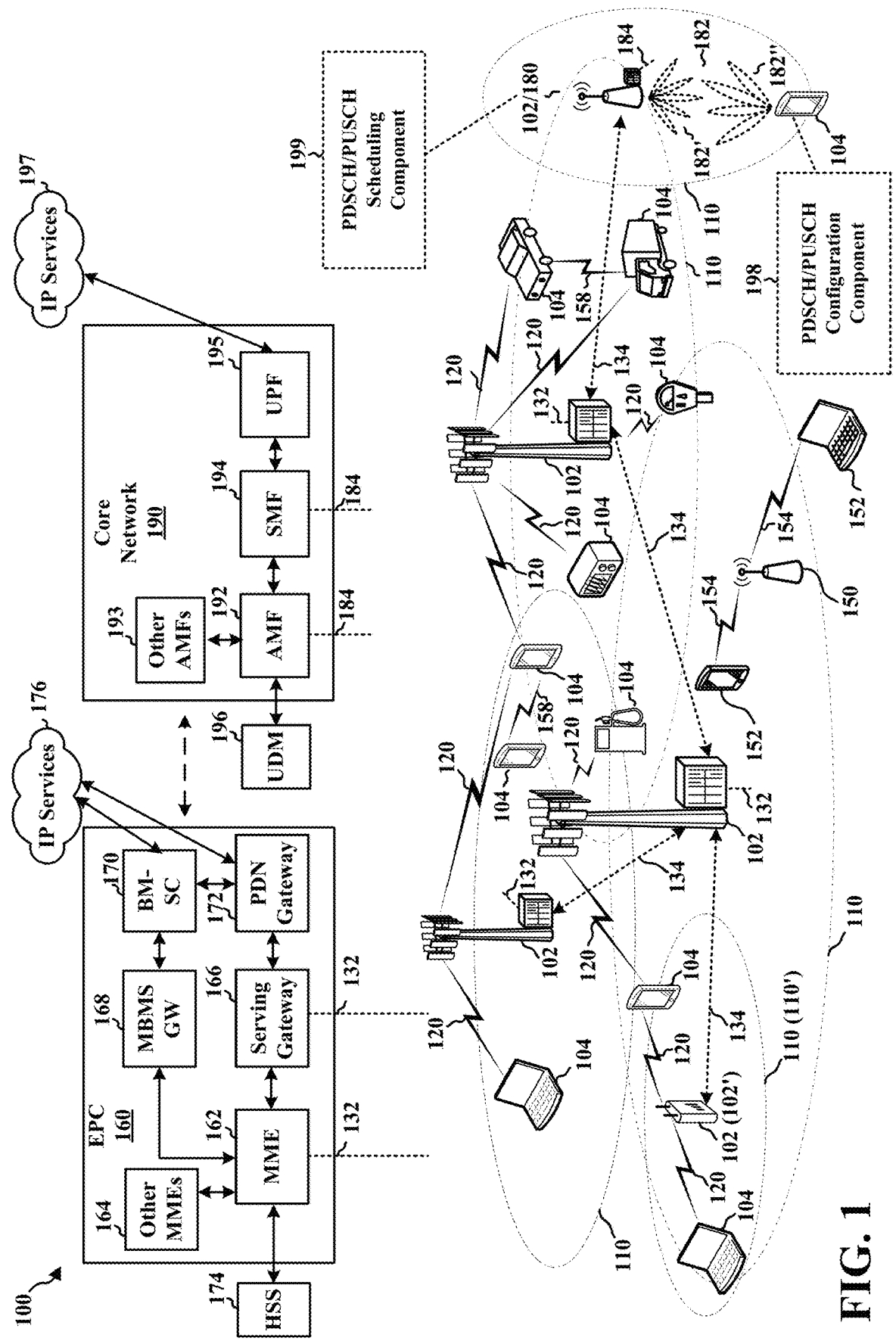
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a PDSCH/PUSCH configuration component 198 configured to receive the PDSCH or to transmit the PUSCH based on a scheduling offset received from the base station. In one configuration, the PDSCH/PUSCH configuration component 198 may be configured to receive a PDCCH including a scheduling offset parameter, where the PDCCH schedules one of a PDSCH for reception in a first sub-band within a BWP or provides an uplink scheduling grant of a PUSCH for transmission in a second sub-band within the BWP. In such configuration, the PDSCH/PUSCH configuration component 198 may communicate with a base station based on one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a physical uplink control channel (PUCCH) is used to schedule the PUSCH.

In certain aspects, the base station 102/180 may include a PDSCH/PUSCH scheduling component 199 configured to schedule the PDSCH to the UE 104 for reception or the PUSCH to the UE 104 for transmission. In one configuration, the PDSCH/PUSCH scheduling component 199 may transmit a PDCCH including a scheduling offset parameter, where the PDCCH schedules one of a PDSCH for a UE to receive in a first sub-band within a BWP or provides an uplink scheduling grant of a PUSCH for the UE to transmit in a second sub-band within the BWP. In such configuration, the PDSCH/PUSCH scheduling component 199 may communicate with the UE in one of a slot for transmitting the PDSCH based on the first sub-band within the BWP and the scheduling offset parameter if the PDCCH schedules the PDSCH, or a slot for receiving the PUSCH based on the second sub-band within the BWP and the scheduling offset parameter if a PUCCH is used to schedule the PUSCH.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [KHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
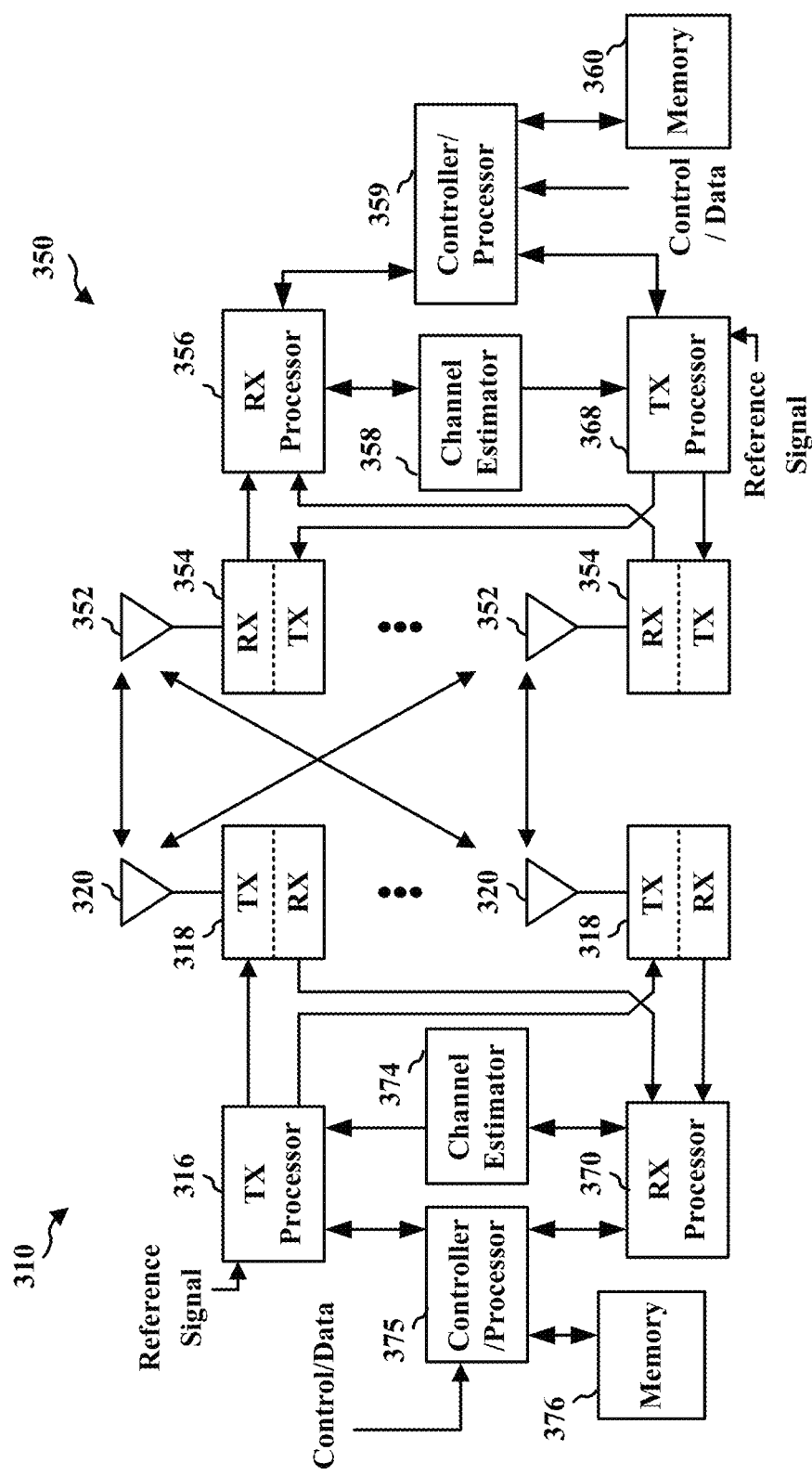
FIG. 3 is a diagram illustrating an example of a base station and user equipment (UE) in an access network according to some aspects.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDSCH/PUSCH configuration component 198 of FIG. 1.

At least one of the TX processor 316, the RX processor 370, and the controller/processor 375 may be configured to perform aspects in connection with the PDSCH/PUSCH scheduling component 199 of FIG. 1.

A base station may operate in a mmW or near mmW frequencies in communication with a UE, such as within the FR2 which includes frequency bands between 24.25 GHz and 52.6 GHz. Similarly, some base stations may further be configured to operate at frequencies beyond the FR2, such as between the frequency bands 52.6 GHz to 114.25 GHz. The frequency bands within this range may be referred to as "frequency range 4 (FR4)," "upper millimeter wave bands" or "sub-THz regime" (collectively as "ultra wide bandwidth regime" hereafter).

For a communication device such as a base station and/or a UE to communicate with other communication device(s), the communication device may include a cascade of electronic components, circuitries, and/or sub-units such as amplifiers, filters, phase shifters, mixers, attenuators and detectors, etc. The cascade of these components may be referred to as a radio frequency chain (RF chain). When the communication device is operating at an ultra wide bandwidth regime, the components within the RF chain of the communication device may tend to be costly, and thus the number of components to be included in the RF chain may be limited. For example, for a base station or a UE operating at an ultra wide bandwidth regime, beamforming is typically specified where the base station or the UE may frequently adjust the direction of its transmitting or receiving beam(s) using phase shifters. As phase shifters supporting high frequencies may be relatively expensive, the base station or the UE may contain only a limited set of phase shifters. In addition, at higher frequencies (e.g., FR2, FR4), beam squinting may be more likely to occur where the direction (e.g., angle) of a beam may not be consistently pointing to a same direction when the operating frequency changes. Under beam squinting, an antenna pattern (e.g., beam) pointing to angle $\theta_0$ at frequency $f_0$ may point to angle $\theta_0+\Delta\theta$ at frequency $f_0+\Delta f$ instead of $\theta_0$. The beam squinting may be mitigated or corrected using phase shifters. However, when the number of phase shifters is limited in the RF chain at the ultra wide bandwidth regime, the base station or the UE may not have sufficient phase shifters to address the beam squinting, which may result in significant beamforming performance loss. For example, the beam of the base station or the UE may not be pointing toward correct direction(s) due to beam squinting, which may result in signal to noise ratio (SNR) loss for the transmission.

A base station may configure a UE with one or more time domain resources for receiving data from the base station (e.g., via PDSCH) or for transmitting a data to the base station (e.g., via PUSCH), where the base station may transmit the configuration to the UE via a PDCCH. In some examples, the UE may receive the PDCCH using a broader beam (which may be referred to as a "coarse beam"), and the UE may receive the PDSCH or transmit the PUSCH using a narrower beam (which may be referred to as a "fine beam"). As it may take time for the UE to tune the beam weight (e.g., from a broader beam to a narrower beam), the base station may schedule an offset between the time a PDCCH is transmitted to the UE and the time the UE receives a corresponding PDSCH or transmits a corresponding PUSCH such that the UE may have sufficient time to tune the beam during the offset.

In one example, the UE may be configured with at least one (which may be a default) time domain resource allocation configuration. The base station may allocate a time domain resource to the UE with an offset based on the time domain resource allocation table, where the table may have multiple rows (e.g., up to 16 rows) with each row capturing or providing scheduling parameters for the time domain resource. The scheduling parameters may include a mapping type, a scheduling offset K (e.g., $K_0$ for PDSCH or $K_2$ for PUSCH), a starting symbol index (S), and a number of symbols (L). The scheduling offset K may indicate the slot index offset for the UE to receive a PDSCH or to transmit a PUSCH after receiving a corresponding PDCCH. The starting symbol index may indicate which symbol within a slot may be used by the UE for receiving the PDSCH or transmitting the PUSCH, and the number of symbols may indicate how many consecutive symbols may be used by the UE for receiving the PDSCH or transmitting the PUSCH following the starting symbol. In some examples, UEs with lower capabilities may specify longer offset as they may take longer RF settling time for their beam weights to be set up, whereas UEs with higher capabilities may use shorter offsets. Thus, the base station may schedule an offset for a UE from the time domain resource allocation table based on the UE's capabilities.

Figure 4:
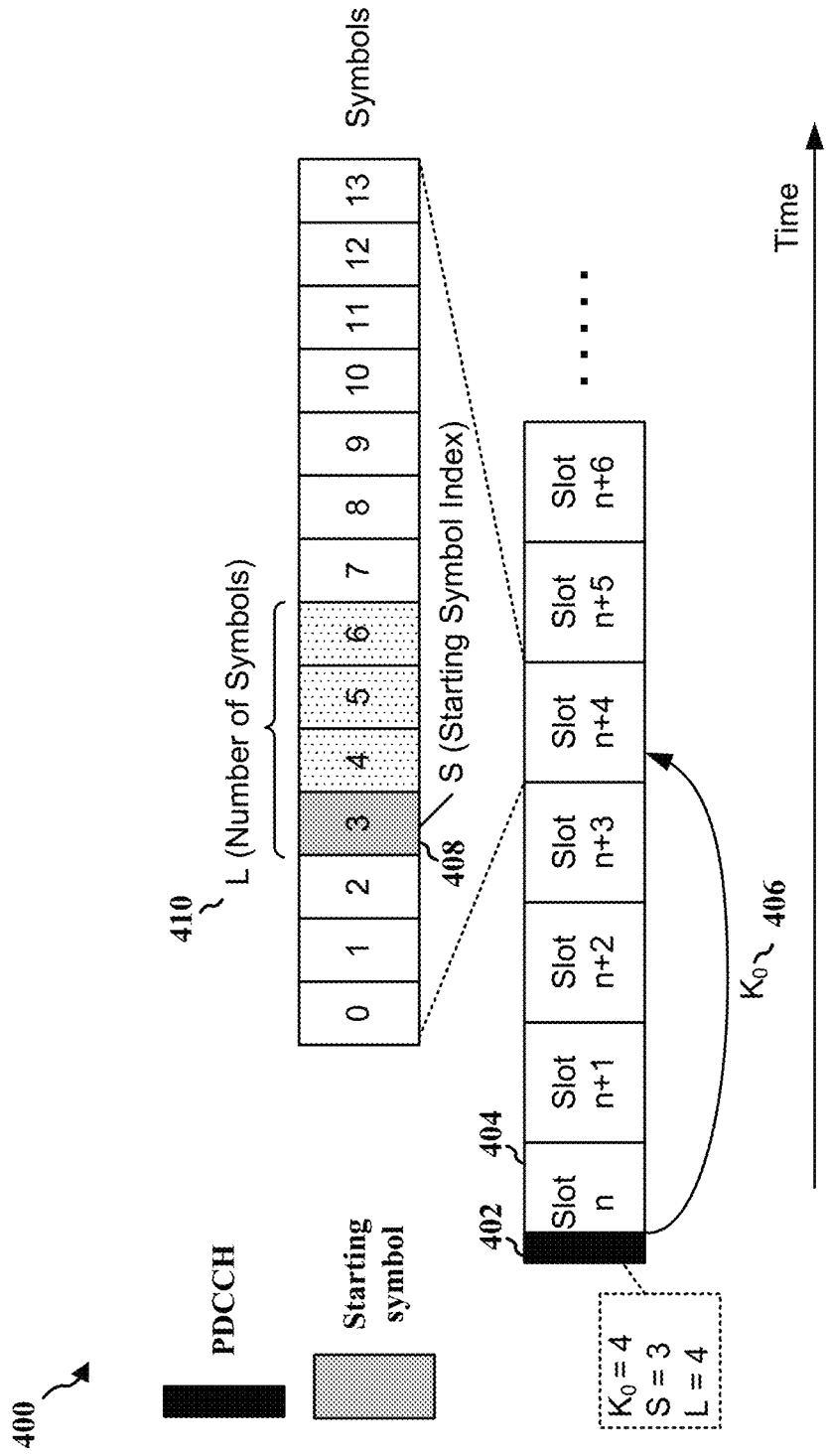
FIG. 4 is a diagram illustrating an example of physical downlink shared channel (PDSCH) scheduling in accordance with various aspects of the present disclosure.

FIG. 4 is a diagram 400 illustrating an example of scheduling a PDSCH for a UE in accordance with various aspects of the present disclosure. A UE may receive a PDCCH 402 at slot n 404, where the PDCCH 402 may indicate to the UE a row index (e.g., 1-16), a downlink allocation (e.g., a starting symbol index (S) 408 and a number of symbols (L) 410, etc.) corresponding to the PDSCH, and a scheduling offset $K_0$ 406 associated with the row index. Based on the indication, the UE may determine that the PDSCH is to be transmitted by the base station at a slot $n+K_0$, and the UE may monitor for the PDSCH at the slot $n+K_0$. As the PDCCH 402 also indicates the downlink resource allocation S 408 and L 410 for the PDSCH within the slot $n+K_0$, the UE may also determine that the PDSCH is to be transmitted by the base station on symbols S, S+1 . . . S+(L−1) of the slot $n+K_0$. For example, as shown by FIG. 4, the PDCCH 402 in slot n 404 may indicate to the UE that the PDSCH is to be transmitted by the base station with a scheduling offset of 4 slots (e.g., at slot n+4 as $K_0$=4) and that the PDSCH may occupy four symbols (e.g., L=4) within the slot n+4 starting with the symbol having the symbol index #3 (e.g., S=3). Based on the indication, the UE may monitor for the PDSCH from the base station at the slot n+4 on symbols corresponding to symbol indexes 3, 4, 5, and 6 within the slot n+4.

Figure 5:
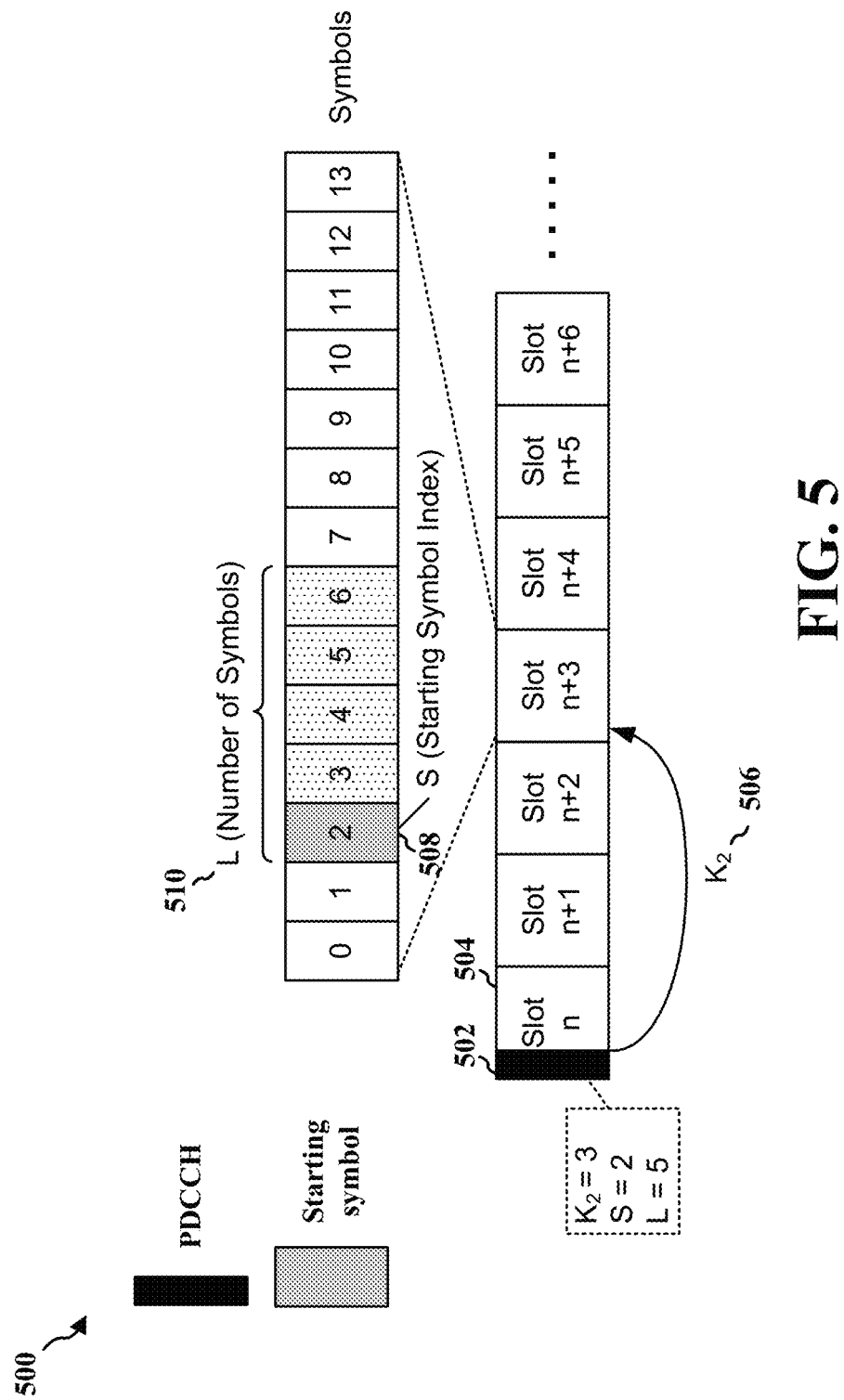
FIG. 5 is a diagram illustrating an example of physical uplink shared channel (PUSCH) scheduling in accordance with various aspects of the present disclosure.

FIG. 5 is a diagram 500 illustrating an example of scheduling a PUSCH for a UE in accordance with various aspects of the present disclosure. Similarly, to the example for scheduling PDSCH in FIG. 4, a UE may receive a PDCCH 502 at slot n 504, where the PDCCH 502 may indicate to the UE a row index, an uplink scheduling grant (e.g., starting symbol index (S) 508 and number of symbols (L) 510, etc.) corresponding to the PUSCH, and a scheduling offset $K_2$ 506 associated with the row index. Based on the indication and the uplink scheduling grant, the UE may transmit the PUSCH to the base station at a slot n+$K_2$. As the PDCCH 502 also indicates the uplink resource allocation S 508 and L 510 for the PUSCH within the slot n+$K_2$, the UE may also determine that it may use symbols S, S+1 . . . S+(L−1) of the slot n+$K_2$ for transmitting the PUSCH when the PDCCH (or a corresponding PUCCH) is used to schedule the PUSCH. For example, as shown by FIG. 5, the PDCCH 502 in slot n 504 may indicate to the UE that the UE may transmit the PUSCH to the base station with a scheduling offset of 3 slots (e.g., at slot n+3 as $K_2$=3) and that the PUSCH may occupy five symbols (e.g., L=5) within the slot n+3 starting with the symbol having the symbol index #2 (e.g., S=2). Based on the indication, the UE may transmit the PUSCH to the base station at slot n+3 using symbols corresponding to symbol indexes 2, 3, 4, 5, and 6 within the slot n+3.

While UEs may use a scheduling offset (e.g., $K_0$ or $K_2$) duration to tune the beam weight of their receiving or transmitting beam(s), different UEs may have different capabilities allowing or disallowing them to change their receiving or transmitting beam(s) when a PDSCH or a PUSCH is activated at the scheduling offset ($K_0$ or $K_2$). For example, if a UE has the capability to change its receiving or transmitting beam(s) before a scheduling offset, the UE may use one or more beams indicated by the base station. The base station may indicate the one or more beams to the UE via a transmission configuration indicator (TCI) state, where the TCI state may be indicate d to the UE in DCI. On the other hand, if a UE does not have the capability to change its receiving or transmitting beam(s) before a scheduling offset, the UE may be configured to adopt a more conservative or a default approach in tuning its beam(s). For example, one or more antenna port(s) of the UE for receiving PDSCH DM-RS or for transmitting PUSCH DM-RS may be configured to be quasi co-located (QCLed) with the antenna port for receiving PDCCH DM-RS or for transmitting PUCCH DM-RS associated with a control resource set (CORESET) with a lowest CORESET identifier (ID). In some examples, two antenna ports may be quasi co-located if properties of the channel over which a symbol on one antenna port is conveyed can be inferred from the channel over which a symbol on the other antenna port is conveyed. In other words, if a UE is unable to configure or tune the beam indicated by the base station within a given offset ($K_0$ or $K_2$) for receiving the PDSCH or for transmitting the PUSCH, the UE may use a beam that is used for receiving a corresponding PDCCH or for transmitting a corresponding PUCCH.

A UE may perform one or more beam switches (e.g., up to 13) within a slot depending on the UE's capability, and the UE may inform the base station regarding this capability. For example, a UE may indicate a QCL time duration parameter (e.g., timedurationForQCL) to the base station defining a minimum number of OFDM symbols for the UE to perform a PDCCH reception and to apply spatial QCL information received in DCI for a PDSCH processing, where the UE may indicate a QCL time duration parameter (e.g., a value of the minimum number of OFDM symbols) per each subcarrier spacing of 60 kHz and 120 kHz, etc. The base station may use this QCL time duration parameter to configure the beam(s) for the UE in connection with the scheduling offset ($K_0$ or $K_2$) to provide the UE with a fine granularity of beam tuning.

Aspects presented herein may enhance the accuracy and efficiency of configuring the scheduling offset (e.g., $K_0$ or $K_2$) and/or the QCL time duration parameter (e.g., timedurationForQCL) for communication devices at high frequency bands, such as those at FR4. In one aspect, the scheduling offset may be sub-band/channelization specific. In other aspects, the QCL time duration parameter may be configured to be a function of a component carrier (CC), such as during a cross-carrier scheduling in FR4.

Figure 6:
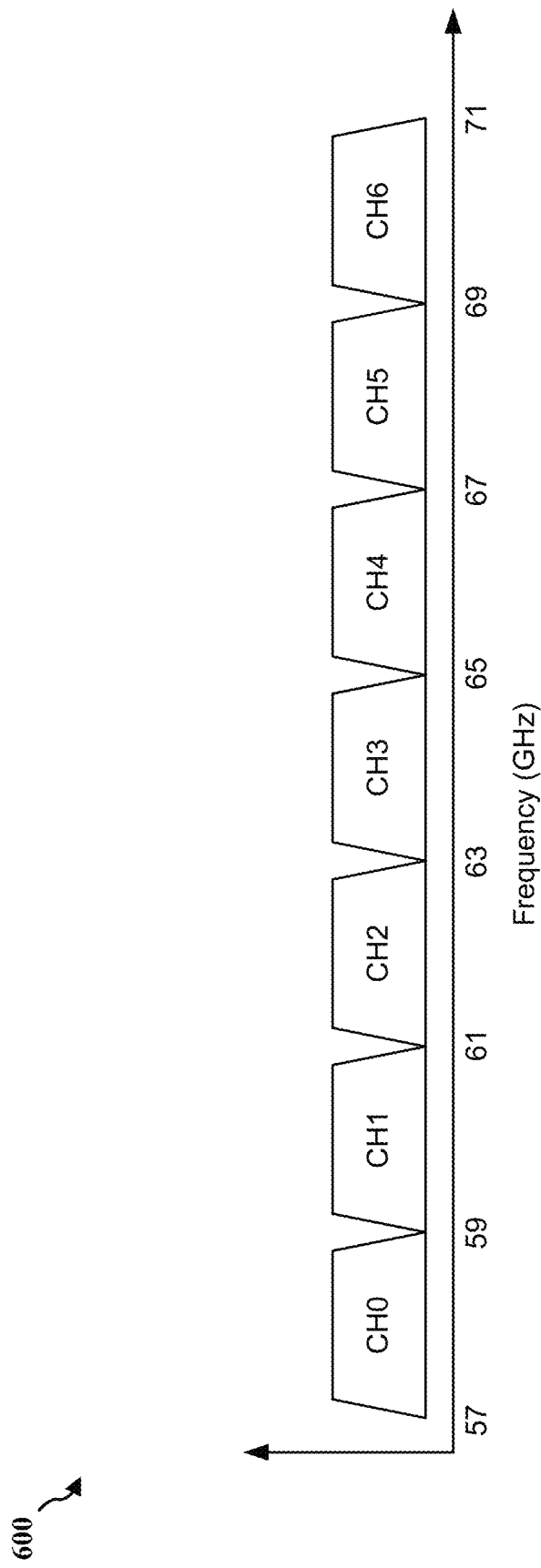
FIG. 6 is a diagram illustrating an example of channelizing a frequency band in accordance with various aspects of the present disclosure.

A frequency band, such as bands within FR2 or FR4, may be channelized by segmenting the frequency band into multiple channels (e.g., sub-bands). This may enable a communication device to use the bandwidths (e.g., channels) within the frequency band in a more dynamic or flexible manner. FIG. 6 is a diagram 600 illustrating an example of channelizing a frequency band in accordance with various aspects of the present disclosure. A frequency band ranges from 57 GHz to 71 GHz may be channelized by segmenting the frequency band into seven channels (e.g., CH0 to CH6), where each channel may have a bandwidth of 2 GHz. For example, channel zero (CH0) may include a bandwidth that ranges from 57 GHz to 59 GHz, channel three (CH3) may include a bandwidth that ranges from 63 GHz to 65 GHz, and channel six (CH6) may include a bandwidth that ranges from 69 GHz to 71 GHz, etc. In some examples, such segmentation or channelization may also be referred to as a 2 GHz channelization of the frequency band. While the example in FIG. 6 uses the frequency band of 57 GHz to 71 GHz with the 2 GHz channelization (e.g., bandwidth per channel), note that the frequency band may be of any frequency range (e.g., 52.6 to 71 GHz, 71 to 114.25 GHz, etc.) and the bandwidth for the channelization may be customized depending on the implementation (e.g., 2.1 GHz, 3.5 GHz, 5 GHz, etc.). The communication device may also use one or more channelizations, such as using one channelization (e.g., 2 GHz) to communicate with a first device, and using another channelization (e.g., 3 GHz) to communicate with a second device and/or with the first device. For example, the communication device may use multiple channelizations in a carrier aggregation (CA) framework for high performance settings (e.g., 2×CA, 3×CA, 4×CA, etc.). In addition, as a bandwidth part (BWP) may be a contiguous set of physical resource blocks (PRBs) (e.g., 24 PRBs) on a given component carrier, where the PRBs may be selected from a contiguous subset of common resource blocks for a given numerology. Thus, PRBs within a BWP may fall on one or more channels (e.g., sub-bands) under channelization.

Figure 7:
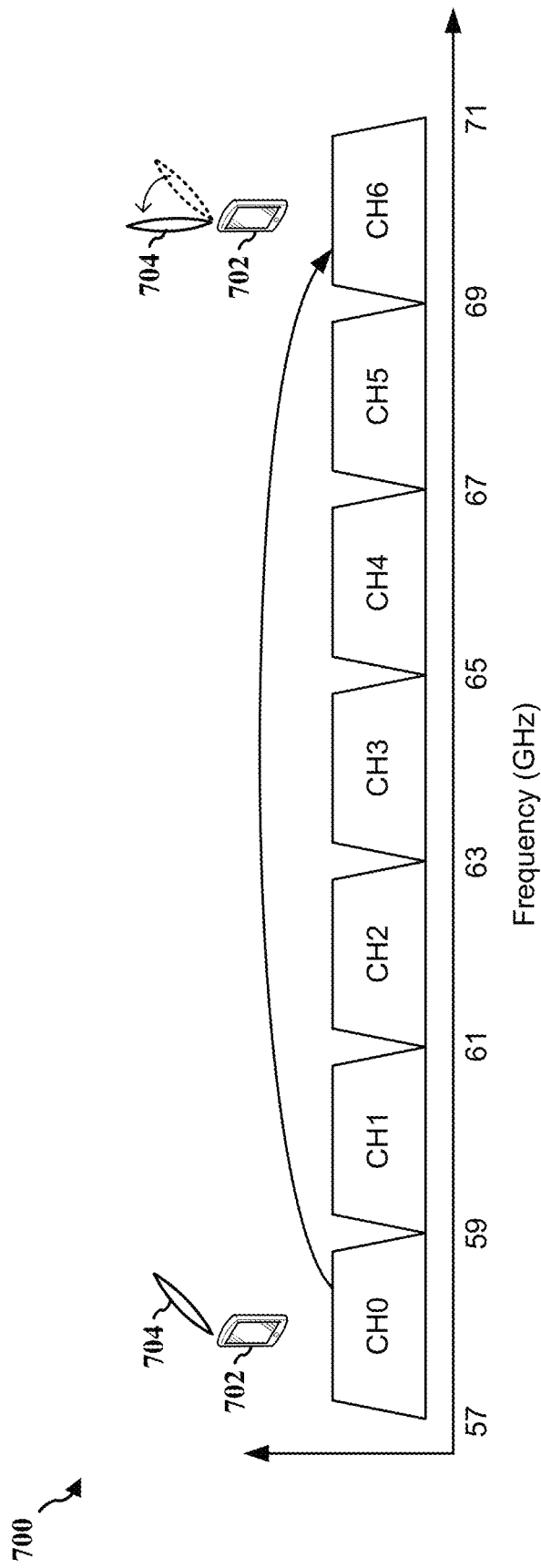
FIG. 7 is a diagram illustrating an example of optimizing a beam based on the channel in accordance with various aspects of the present disclosure.

After a frequency band is channelized, a communication device (e.g., a UE, a base station, etc.) may use one or more channels within the frequency band for communication. For example, the communication device may use one channel at a time (e.g., CH0 or CH3) or multiple channels at a time (e.g., CH1, CH2 and CH3) for communication, where the communication device may select the channel(s) dynamically. The communication device may also use one channel for transmitting or receiving a portion of a data in one or more slot(s) or symbol(s) within a slot, and may use another channel(s) for transmitting or receiving another portion of the data. However, as beam squinting may occur at higher frequencies where the direction of a beam from a communication device may not be consistently pointing to a same direction when the operating frequency changes, a beam weight (e.g., a beam width, a beam direction, side lobe levels, and/or grating lobes, etc.) configured or optimized for one channel may not be suitable for another channel, and link margin loss may result when the communication device switches channels. For example, as shown by a diagram 700 of FIG. 7, a beam 704 of a communication device 702 may be optimized for communicating (e.g., transmitting or receiving a data) at CH0 (e.g., 57-59 GHz) with a target beam. However, when the communication device 702 switches the communication channel to CH7 (e.g., 69-71 GHz), the direction of the beam 704 may change due to beam squinting. This may cause the beam 704 to misalign with the target beam when switching from CH0 to CH7, which may result in link margin loss for the communication. Thus, the communication device may take some time to refine its beam(s) after changing channels.

In aspects of the present disclosure, a scheduling offset (e.g., $K_0$ or $K_2$) may be configured to be sub-band (e.g., channel) or channelization specific to provide a communication device with sufficient time to tune its beam(s) after switching channel, such as to address beam switching latencies. For example, a scheduling offset may be configured to be a function of a sub-band (e.g., channel), such as a function of a sub-band within a BWP. Also, if a communication device, such as a UE, is scheduled for one sub-band, and then the UE requests or is signaled to change to another sub-band, the associated time domain resource (e.g., PDSCH, PUSCH, etc.) allocation configuration may be changed appropriately to handle or accommodate the radio frequency or beam switching latencies.

Figure 8:
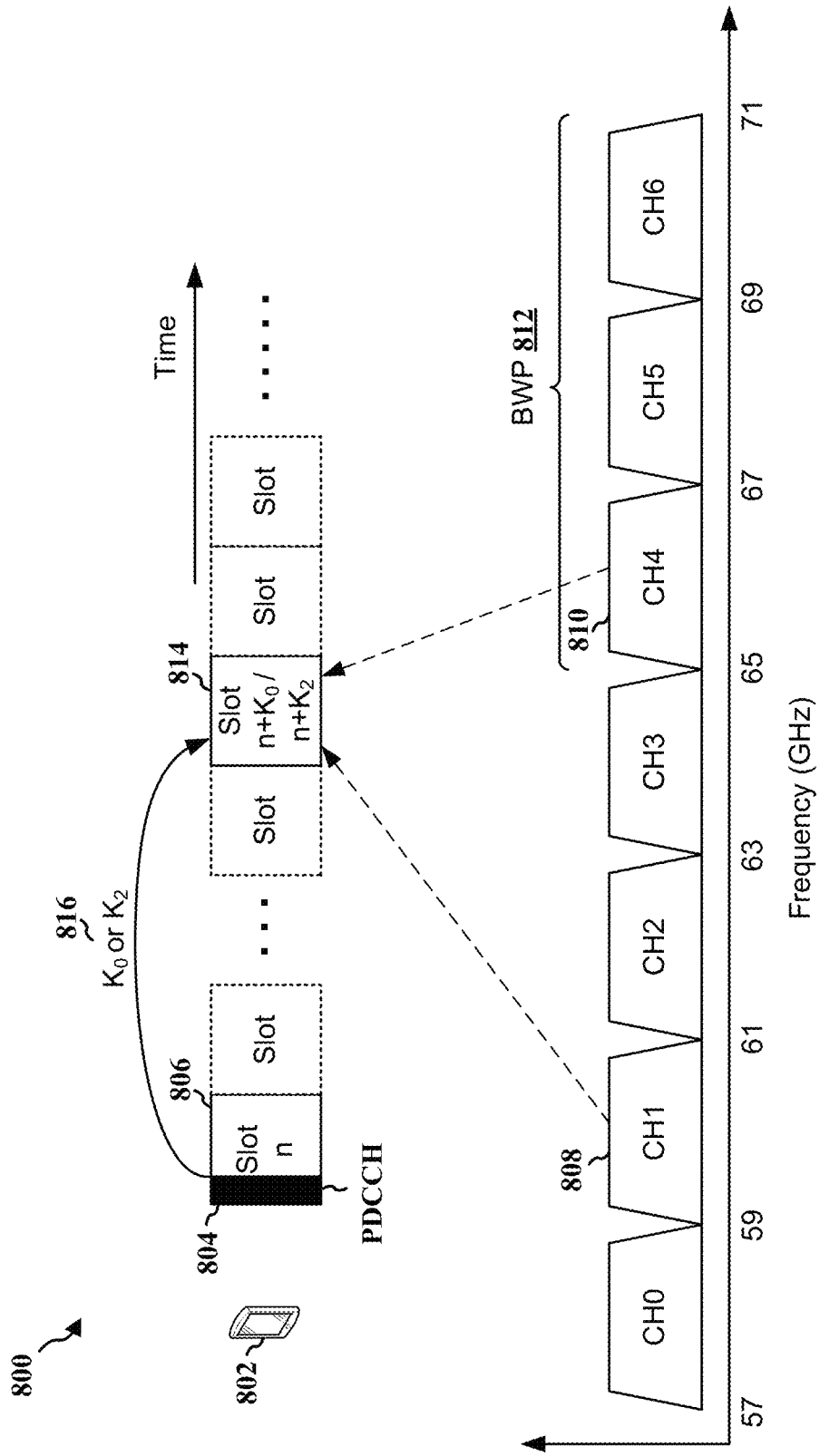
FIG. 8 is a diagram illustrating an example of providing the scheduling offset based on channels in accordance with various aspects of the present disclosure.

FIG. 8 is a diagram 800 illustrating an example of providing a scheduling offset (e.g., $K_0$ or $K_2$) for a UE based at least in part on a sub-band (e.g., channel) of a channelized frequency band in accordance with various aspects of the present disclosure. As described in connection with FIG. 6, a frequency band ranges from 57 GHz to 71 GHz may be channelized into seven channels (CH0 to CH6) with each channel having a 2 GHz bandwidth. In one example, a communication device, such as a UE 802, may receive a PDCCH 804 from a base station at slot n 806 for scheduling a PDSCH for reception or a PUSCH for transmission. The UE 802 may receive the PDSCH or transmit the PUSCH using one or more channels (e.g., sub-bands) within the frequency band, such as using channel one 808 for receiving the PDSCH, or the UE 802 may receive the PDSCH or transmit the PUSCH using one or more channels (e.g., sub-bands) within a BWP 812 in the frequency band, such as by using channel four 810 within the BWP 812 for transmitting a PUSCH, etc. Then, the UE 802 may determine a slot 814 for receiving the PDSCH or for transmitting the PUSCH based at least in part on a selected channel (e.g., 808, 810, etc.). For example, the UE 802 may determine a scheduling offset 816 for receiving a PDSCH (e.g., for $K_0$) or for transmitting a PUSCH (e.g., for $K_2$) based at least in part on a selected channel, where the scheduling offset 816 may differ for each channel. As an example, channel one 808 may specify a scheduling offset of 3 slots (e.g., $K_0$ or $K_2$=3), such that the UE 802 may receive the PDSCH or transmit the PUSCH at slot n+3. On the other hand, channel four 810 may specify a scheduling offset of 5 slots (e.g., $K_0$ or $K_2$=5), such that the UE 802 may receive the PDSCH or transmit the PUSCH at slot n+5, etc. Each channel or sub-band within the BWP 812 may also be associated with different values of scheduling offset 816. For example, CH5 or CH6 may have different scheduling offset 816 than CH0. In some examples, the value of the scheduling offset 816 may be determined based on an analog beamforming codebook, a pre-defined set of rules or configurations and/or based on the UE 802's capabilities. As such, the UE 802 may determine the slot for receiving the PDSCH based on a sub-band within a BWP and a scheduling offset parameter when a PDCCH schedules a PDSCH. Similarly, the UE may also determine the slot for transmitting the PUSCH based on a sub-band within a BWP and a scheduling offset parameter when a PUCCH schedules a PUSCH.

In another aspect of the present disclosure, for a cross-carrier scheduling in high frequencies such as bands within FR4, a QCL time duration parameter (e.g., timedurationForQCL) may be configured to be a function of a CC index. In a network supporting carrier aggregation with cross-carrier scheduling, the cross-carrier scheduling may enable a UE to connect to different nodes to receive a PDCCH on different carriers to reduce or eliminate inter-cell interference on the PDCCH. With cross-carrier scheduling, a data transmission or a data reception for a UE may be dynamically scheduled on different CCs. For example, a UE may receive a PDSCH on a CC that is different from the CC in which a corresponding PDCCH is received. Similarly, the UE may transmit a PUSCH on an associated CC that is different from the CC in which an uplink grant is received.

Figure 9:
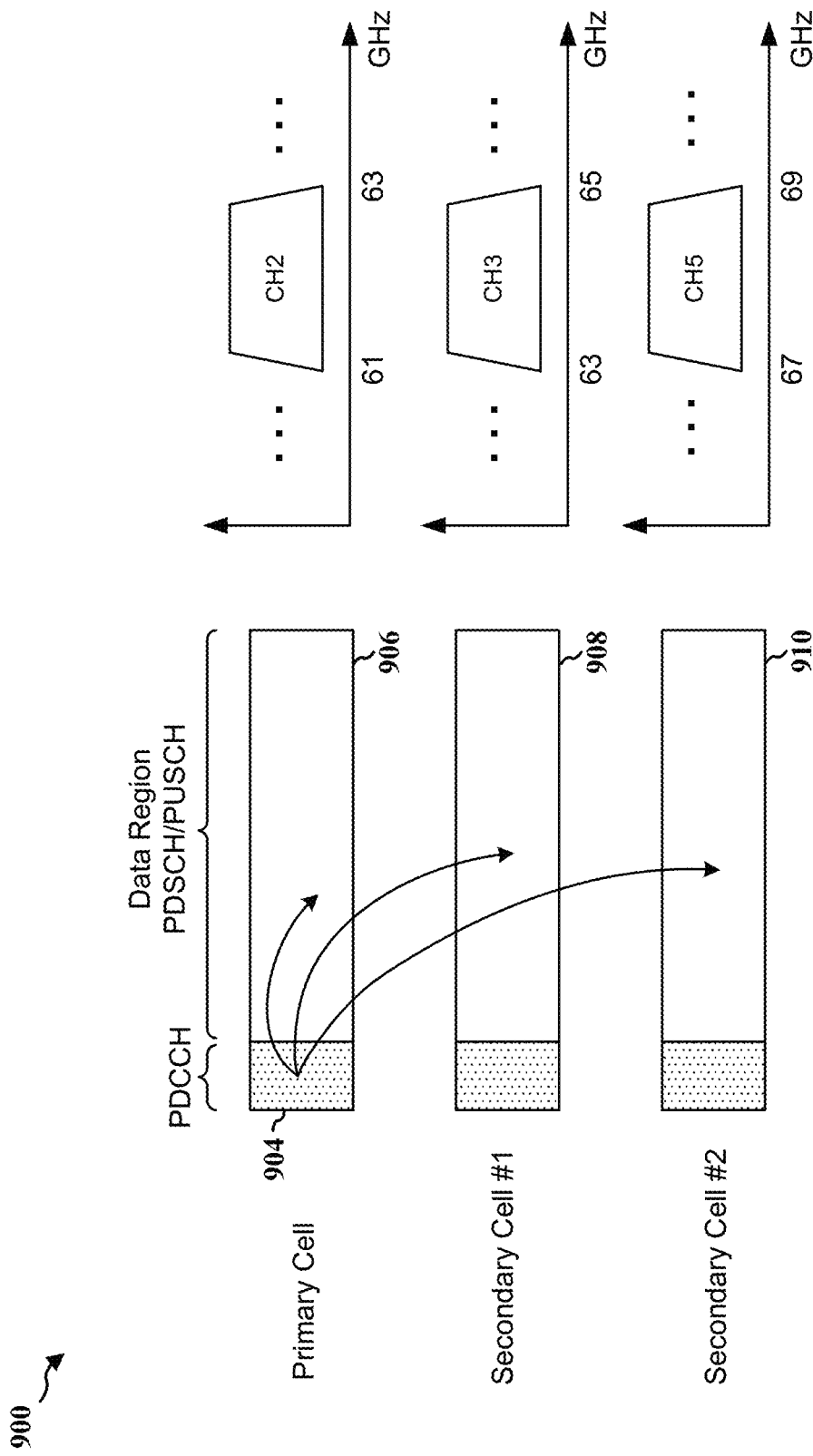
FIG. 9 is a diagram illustrating an example of cross-carrier scheduling in accordance with various aspects of the present disclosure.

FIG. 9 is a diagram 900 illustrating an example of a cross-carrier scheduling in accordance with various aspects of the present disclosure. A PDCCH 904 transmitted on a primary cell may be used to schedule one or more PDSCHs or PUSCHs for a UE on different cells. For example, the PDCCH 904 may indicate/schedule a first downlink resource (e.g., a first CC, a PDSCH 906, etc.) on the primary cell, a second downlink resource (e.g., a second CC, a PDSCH 908, etc.) on a secondary cell #1, and a third downlink resource (e.g., a third CC, a PDSCH 910, etc.) on a secondary cell #2. This may also be applied to the PUSCH, where the PDCCH 904 may schedule uplink resources (e.g., PUSCHs) on the primary cell, the secondary cell #1, and the secondary cell #2, respectively. In some examples, the cross-carrier scheduling may enable a primary cell to schedule resources on a secondary cell without the PDCCH, but the primary cell may not be able to schedule resources on a secondary cell with its own PDCCH.

In some examples, when cross-carrier scheduling is applied with channelization of a frequency band, such as described in connection with FIG. 6, each CC (e.g., cell) may be scheduled on a different sub-band (e.g., channel). For example, referring back to FIG. 9, the PDSCH 906 transmitted on the primary cell (e.g., the first CC) may use CH2, the PDSCH 908 transmitted on the secondary cell #1 (e.g., the second CC) may use CH3, and the PDSCH 910 transmitted on the secondary cell #2 (e.g., the third CC) may use CH5, etc. As such, a base station may be configured to determine a scheduling offset (e.g., $K_0$ or $K_2$) between a PDCCH and a corresponding PDSCH/PUSCH based at least in part on which CC or CC index (e.g., a first CC, a second CC, a third CC, etc.) is associated with the corresponding PDSCH/PUSCH. For example, the slot for receiving the PDSCH 908 may be determined based on the second CC, or the slot for transmitting the PUSCH on the second cell #2 may be determined based on the third CC, where the second CC and the third CC may be associated with CH3 and CH5 of the channelized frequency band, respectively. In another example, the PDCCH may be on a first CC, the PDSCH may be on a second CC, the PUCCH may be on a third CC, and the PUSCH may be on a fourth CC, where the first CC may be different from the second CC, the third CC, and/or the fourth CC. In other examples, the UE may determine the slot for receiving the PDSCH further based on the second CC, and may determine the slot for transmitting the PUCCH and the PUSCH further based on the third and the fourth CCs. For example, a first sub-band (e.g., CH3) may be based on the second CC and a second sub-band (e.g., CH5) may be based on the third and the fourth CCs, etc.

In some examples, the time duration for QCL parameter (e.g., timedurationForQCL) for receiving a PDSCH or for transmitting a PUSCH may also be based on their corresponding CC or CC index. For example, the QCL parameter for receiving the PDSCH 908 may be determined based on the second CC, or the QCL parameter for transmitting the PUSCH on the secondary cell #2 may be determined based on the third CC, etc., where the second CC and the third CC may be associated with different channels (e.g., with CH3 and CH5, respectively). The base station may use the determined QCL time duration parameters to configure the beam(s) for the UE in connection with the scheduling offset ($K_0$ or $K_2$) to provide the UE with a fine granularity of beam tuning within a channelized high frequency band, where the beamforming operation may be optimized over the ultra wide bandwidth regime via the appropriate design of the scheduling offsets.

In another aspect of the present disclosure, a common RF/analog beamforming codebook may be used across the ultra wide bandwidth regime or range, and/or a sub-band (e.g., channel) specific RF/analog beamforming codebook may be mapped to specific changes in a PDSCH or PUSCH time domain resource allocation configuration. FIG. 10A is a diagram 1000A illustrating an example of using a common analog beamforming codebook across a channelized frequency band in accordance with various aspects of the present disclosure. As described in connection with FIG. 6, a frequency band from 57 GHz to 71 GHz may be channelized into seven channels (CH0 to CH6) with each channel having a 2 GHz bandwidth. A common analog beamforming codebook may be pre-defined or configured for a UE and/or for a base station, where the common analog beamforming codebook may define one or more parameters for a resource allocation, such as the scheduling offset ($K_0$ or $K_2$), the mapping type, the starting symbol index (S), the number of symbols (L) and/or the QCL time duration parameter for each sub-band (e.g., CH0 to CH6), etc. Thus, when a base station is scheduling a PDSCH or a PUSCH for a UE in one or more channel(s), the base station may apply one or more resource allocation parameters provided by the common analog beamforming codebook. For example, the base station may schedule PDSCHs to be transmitted to the UE using CH2 and CH5, and the common analog beamforming codebook may indicate that a scheduling offset (e.g., $K_0$) of 3 slots may be applied to the PDSCH at CH2, and a scheduling offset of 5 slots may be applied to the PDSCH at CH5, etc. In one example, the common analog beamforming codebook may include a row index for each sub-band (e.g., channel), and the base station may indicate the PUSCH or the PDSCH time domain resource allocation for each sub-band to the UE by indicating the corresponding row index to the UE. In other example, the common analog beamforming codebook may be implemented at the UE and not at the base station. In this case, the UE may indicate the parameter(s) within the common analog beamforming codebook to the base station, and the base station may apply the parameter(s) based on the indication.

FIG. 10B is a diagram 1000B illustrating an example of using a sub-band specific analog beamforming codebook in a channelized frequency band, where each channel (e.g., CH0 to CH6) may have its own analog beamforming codebook in accordance with various aspects of the present disclosure. Similarly, each analog beamforming codebook may define one or more parameters for a resource allocation, such as the scheduling offset ($K_0$ or $K_2$), the mapping type, the starting symbol index (S), the number of symbols (L) and/or the QCL time duration parameter for each sub-band (e.g., CH0 to CH6), etc. For example, a base station may schedule a PDSCH to be transmitted to a UE using CH3, and a CH3 specific analog beamforming codebook may be used (e.g., by the base station) to indicate that a scheduling offset (e.g., $K_0$) of 4 slots may be applied to the PDSCH. As the sub-band specific analog beamforming codebook may be created and optimized for each sub-band, it may provide a better estimation in time domain resource allocation configuration than a common analog beamforming codebook. In addition, each sub-band specific analog beamforming codebook may be modified or replaced without affecting other sub-band specific analog beamforming codebooks. As such, the scheduling offset ($K_0$ or $K_2$) and/or the QCL time duration parameter may be configured to be a function of (e.g., based on) one or more analog beamforming codebooks in a channelized frequency band. Similarly, the sub-band specific analog beamforming codebook may be implemented at the UE and not at the base station. In this case, the UE may indicate the parameter(s) within the sub-band specific analog beamforming codebook to the base station, and the base station may apply the parameter(s) based on the indication.

Figure 11:
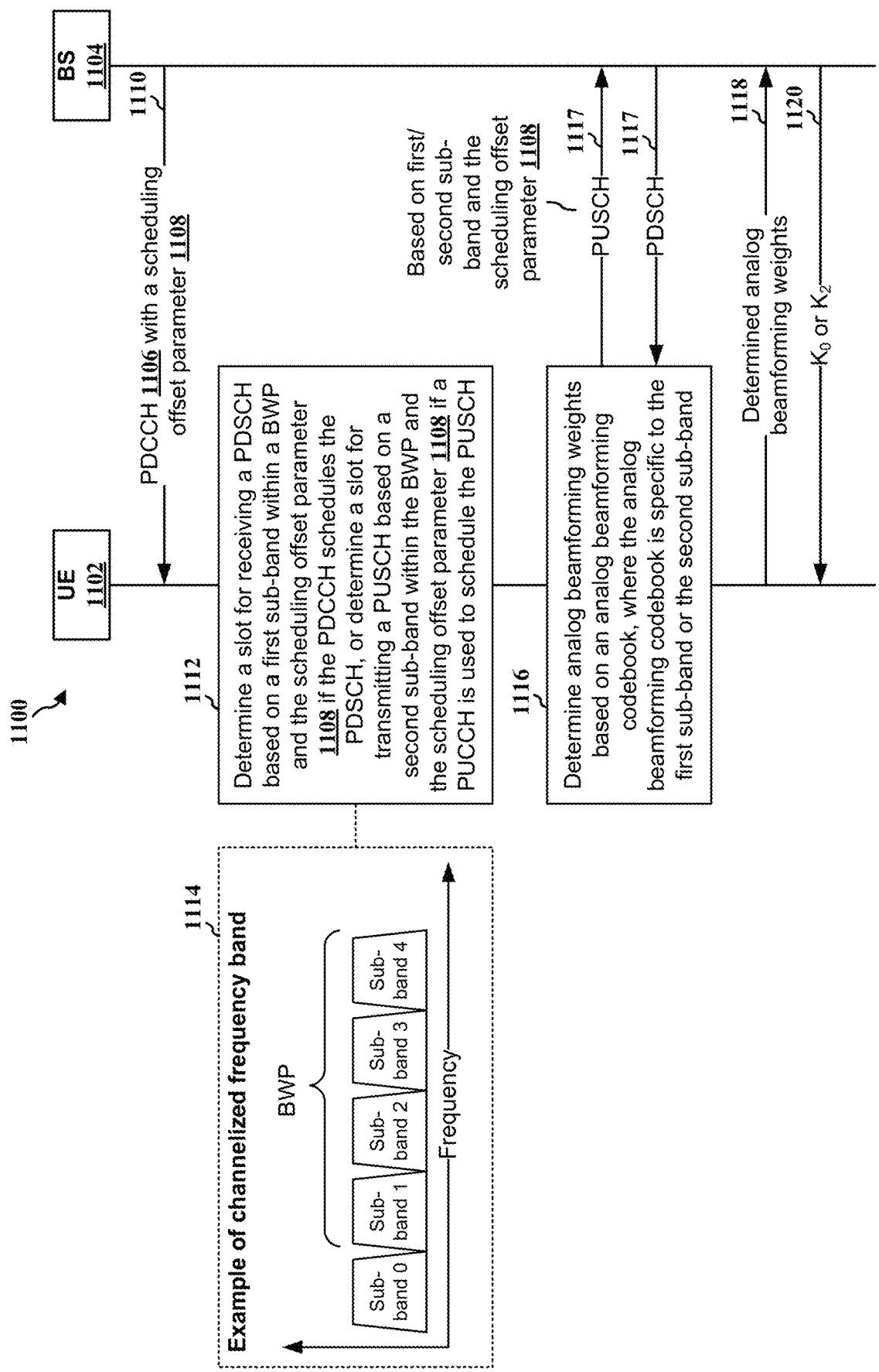
FIG. 11 is a communication flow illustrating an example of determining a scheduling offset based on a sub-band in accordance with various aspects of the present disclosure.

FIG. 11 is a communication flow 1100 illustrating an example of determining a scheduling offset based on a sub-band in accordance with various aspects of the present disclosure. The numberings associated with the communication flow 1100 do not specify a particular temporal order and are merely used as references for the communication flow 1100.

At 1110, a base station 1104 may transmit a PDCCH 1106 that includes a scheduling offset parameter 1108 to a UE 1102. The base station 1104 may use the PDCCH 1106 to schedule a PDSCH for the UE 1102 to receive in a first sub-band within a BWP, such as shown at 1114, or to provide an uplink scheduling grant of a PUSCH for the UE 1102 to transmit in a second sub-band within the BWP.

At 1112, after the UE 1102 may determine a slot for receiving the PDSCH based on the first sub-band within the BWP and the scheduling offset parameter 1108 if the PDCCH schedules the PDSCH, or the UE 1102 may determine a slot for transmitting the PUSCH based on the second sub-band within the BWP and the scheduling offset parameter 1108 if a PUCCH is used to schedule the PUSCH.

In one example, to determine the slot for receiving the PDSCH based on the first sub-band within the BWP, the UE 1102 may determine $K_0$ for the first sub-band within the BWP, where the slot for receiving the PDSCH may be slot $n+K_0$ (e.g., n is the slot in which the PDCCH is received and $K_0$ is a slot scheduling offset). Similarly, to determine the slot for transmitting the PUSCH based on the second sub-band within the BWP, the UE 1102 may determine $K_2$ for the second sub-band within the BWP, where the slot for transmitting the PUSCH may be slot $n+K_2$ (e.g., n is the slot in which the PUCCH is transmitted and $K_2$ is a slot scheduling offset. In one example, $K_0$ or $K_2$ may be different for at least two different sub-bands within the same BWP.

In another example, as described in connection with FIGS. 8 and 9, the scheduling offset parameter 1108 may be determined based on the first sub-band or the second sub-band, and the first sub-band or the second sub-band may be a channel within a channelized frequency band, such as shown at 1114.

At 1116, the UE 1102 may determine analog beamforming weights based on an analog beamforming codebook, where the analog beamforming codebook may be specific to the first sub-band or the second sub-band.

At 1118, the UE 1102 may transmit information to the base station 1104 indicating the determined analog beamforming weights. In response, at 1120, the UE 1102 may receive information indicating the $K_0$ or the $K_2$ from the base station 1104.

In one example, the PDCCH may be on a first CC, the PDSCH may be on a second CC, the PUCCH may be on a third CC, and the PUSCH may be on a fourth CC, where the first CC may be different than the second, the third, or the fourth CC. In such an example, the slot for receiving the PDSCH may be determined further based on the second CC, and the slots for transmitting the PUCCH and the PUSCH may be determined further based on the third and the fourth CCs, where the first sub-band may be based on the second CC and the second sub-band may be based on the third and the fourth CCs, etc. In such an example, a time duration for QCL parameter for receiving the PDSCH within the BWP may be based on the second CC, and for transmitting the PUCCH and the PUSCH within the BWP is based on the third and the fourth CCs.

At 1117, the UE 1102 may communicate with the base station 1104 based on the first sub-band or the second sub-band within the BWP and the scheduling offset parameter 1108. For example, the UE 1102 may receive a PDSCH from the base station 1104 based on the first sub-band within the BWP and the scheduling offset parameter 1108 when the PDCCH schedules the PDSCH, and/or the UE 1102 may transmit a PUSCH based on the second sub-band within the BWP and the scheduling offset parameter 1108 when a PUCCH is used to schedule the PUSCH, etc.

Figure 12:
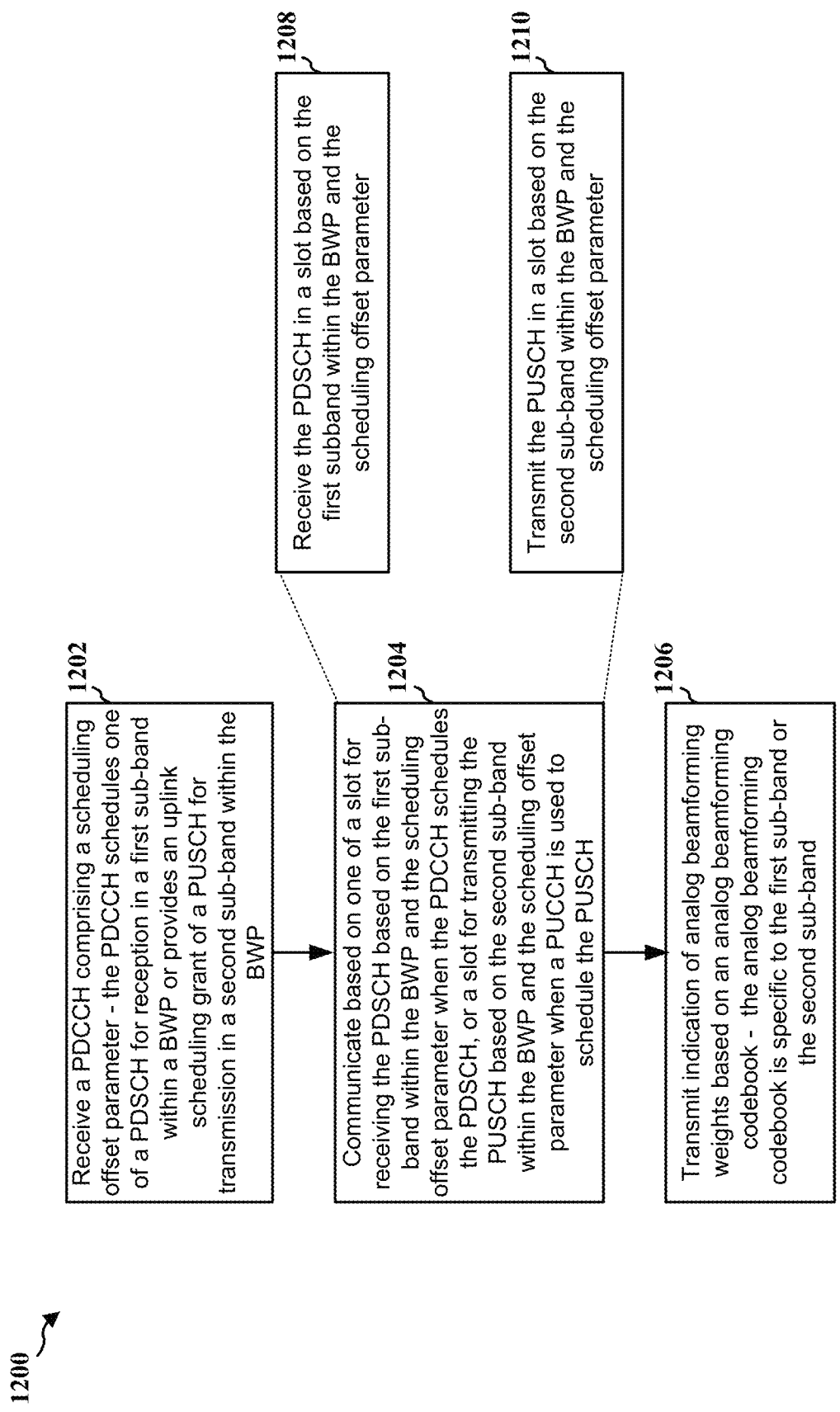
FIG. 12 is a flowchart of a method of wireless communication.

FIG. 12 is a flowchart of a method 1200 of wireless communication. The method may be performed by a UE or a component of a UE (e.g., the UE 106, 350, 802, 1102; the communication device 702; the apparatus 1202; a processing system, which may include the memory 360 and which may be the entire UE 350 or a component of the UE 350, such as the TX processor 368, the RX processor 356, and/or the controller/processor 359). The method may enable a UE to receive a PDCCH including a scheduling offset parameter, where the scheduling offset parameter may indicate the slot in which a corresponding PDSCH is to be received by the UE in a sub-band within a BWP or in which a corresponding PUSCH is to be transmitted by the UE in a sub-band within a BWP.

At 1202, the UE may receive a PDCCH including a scheduling offset parameter, where the PDCCH may schedule one of a PDSCH for reception in a first sub-band within a BWP or an uplink scheduling grant of a PUSCH for transmission in a second sub-band within the BWP, such as described in connection with FIGS. 4, 5, 8, and 11. For example, at 1110, the UE 1102 may receive a PDCCH 1106 that includes a scheduling offset parameter 1108 from the base station 1104, where the scheduling offset parameter may be determined based on the first sub-band or the second sub-band, and the first sub-band or the second sub-band may be a channel within a channelized frequency band, such as shown at 1114. The reception of the PDCCH including the scheduling offset parameter may be performed by, e.g., the scheduling offset process component 1340 and/or the reception component 1330 of the apparatus 1302 in FIG. 13.

At 1204, the UE may communicate with a base station based on one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a PUCCH is used to schedule the PUSCH, such as described in connection with FIGS. 4, 5, 8, and 11. For example, at 1117, the UE 1102 may communicate with the base station 1104 based on the first sub-band or the second sub-band within the BWP and the scheduling offset parameter 1108. The communication may be performed by, e.g., the slot determination component 1342, the reception component 1330, and/or the transmission component 1334 of the apparatus 1302 in FIG. 13.

In one example, the slot for receiving the PDSCH may be based on the first sub-band within the BWP and on $K_0$ for the first sub-band within the BWP, the slot for receiving the PDSCH being slot $n+K_0$, where n is the slot in which the PDCCH is received and $K_0$ is a slot scheduling offset for the PDSCH, such as described in connection with FIGS. 4, 5, and 8. Similarly, the slot for transmitting the PUSCH may be based on the second sub-band within the BWP is based on $K_2$ for the second sub-band within the BWP, the slot for transmitting the PUSCH being slot $n+K_2$, where n is the slot in which the PUCCH is transmitted and $K_2$ is a slot scheduling offset for the PUSCH, as described in connection with FIGS. 4, 5 and 8. In some examples, the $K_0$ may be different for at least two different sub-bands within the same BWP, and the $K_2$ may also be different for at least two different sub-bands within the same BWP.

At 1206, the UE may transmit information to the base station indicating analog beamforming weights, the analog beamforming weights may be based on an analog beamforming codebook, where the analog beamforming codebook is specific to the first sub-band or the second sub-band, such as described in connection with FIGS. 10A, 10B, and 11. For example, at 1116, the UE 1102 may determine analog beamforming weights based on an analog beamforming codebook, where the analog beamforming codebook is specific to the first sub-band or the second sub-band. Then, at 1118, the UE 1102 may transmit the determined analog beamforming weights to the base station 1104. The transmission of the analog beamforming weights may be performed by, e.g., the slot beamforming weights determination component 1344 and/or the transmission component 1334 of the apparatus 1302 in FIG. 13. Then, the UE may receive, in response to the transmitted information, information indicating one of the $K_0$ or the $K_2$, such as shown at 1118 and 1120 of FIG. 11.

In another example, the PDCCH may be on a first CC, the PDSCH may be on a second CC, the PUCCH may be on a third CC, and the PUSCH may be on a fourth CC, where the first CC may be different than the second, the third, or the fourth CC. Note that the use of "first," "second," "third" and "fourth" does not specify a particular temporal order and merely indicates different CCs, such as described in connection with FIG. 9. In one example, the UE may determine the slot for receiving the PDSCH based on the second CC, and the UE may determine the slots for transmitting the PUCCH and the PUSCH based on the third and the fourth CCs, where the first sub-band may be based on the second CC and the second sub-band may be based on the third and the fourth CCs, etc. In another example, a time duration for QCL parameter for the UE to receive the PDSCH within the BWP may be based on the second CC, and for the UE to transmit the PUCCH and the PUSCH within the BWP may be based on the third and the fourth CCs.

Figure 13:
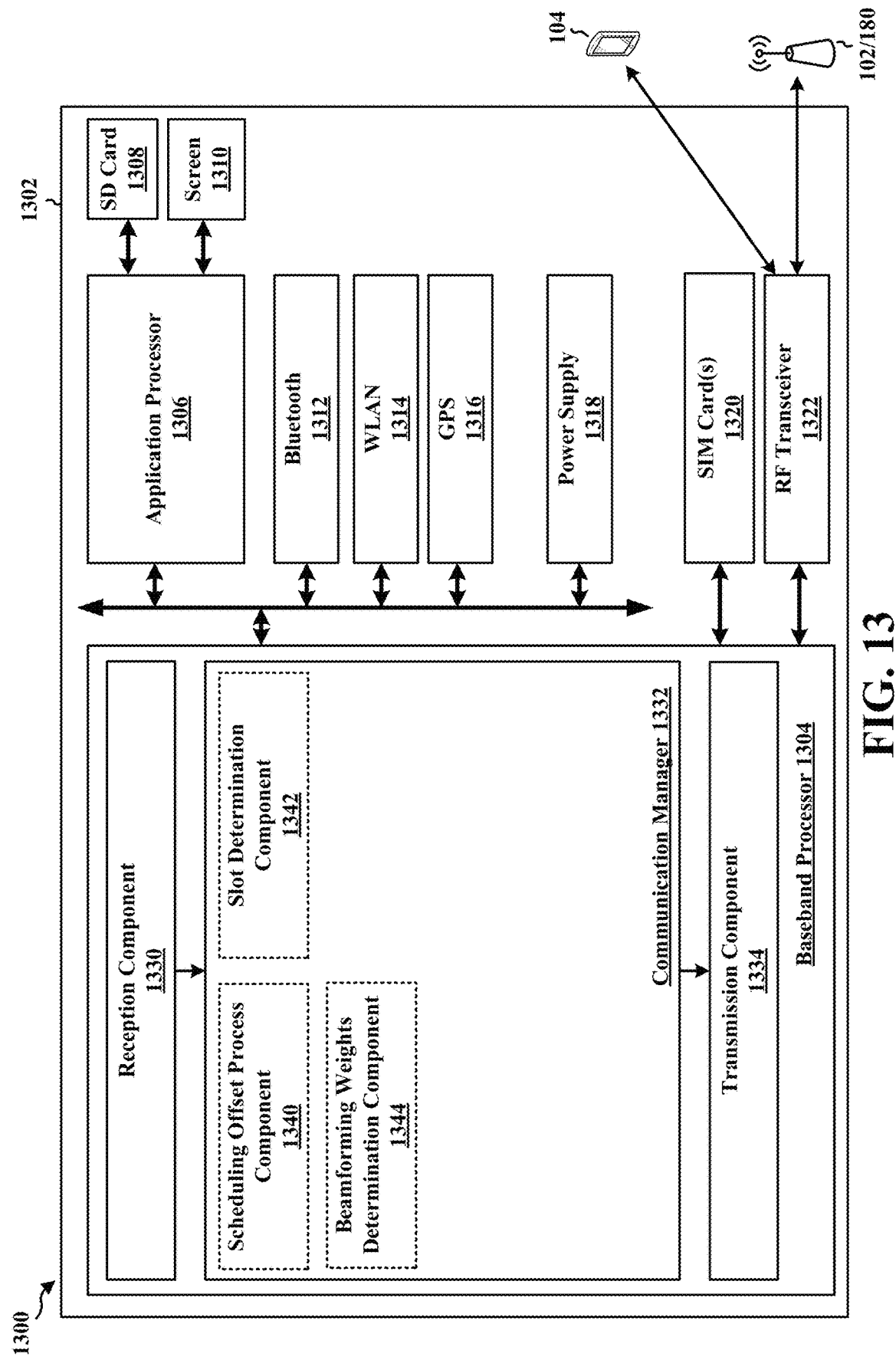
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a baseband processor 1304 (also referred to as a modem) coupled to a RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described supra. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the UE (e.g., of the device 350) and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a scheduling offset process component 1340 that is configured to receive a PDCCH including a scheduling offset parameter, where the PDCCH schedules one of a PDSCH for reception in a first sub-band within a BWP or an uplink scheduling grant of a PUSCH for transmission in a second sub-band within the BWP, e.g., as described in connection with 1202 of FIG. 12. The communication manager 1332 further includes a slot determination component 1342 that is configured to communicate with a base station based on one of a slot for receiving the PDSCH based on the first sub-band within the BWP and the scheduling offset parameter when the PDCCH schedules the PDSCH (e.g., as shown at 1208), or a slot for transmitting the PUSCH based on the second sub-band within the BWP and the scheduling offset parameter when a PUCCH is used to schedule the PUSCH (e.g., as shown at 1210), e.g., as described in connection with 1204 of FIG. 12. The communication manager 1332 further includes a beamforming weights determination component 1344 that is configured transmit information to the base station indicating analog beamforming weights, the analog beamforming weights being based on an analog beamforming codebook, wherein the analog beamforming codebook is specific to the first sub-band or the second sub-band, e.g., as described in connection with 1206 of FIG. 12.

The apparatus may include additional components that perform each of the blocks of the algorithm in the flowchart of FIG. 12. As such, each block in the flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband processor 1304, includes means for receiving a PDCCH including a scheduling offset parameter, where the PDCCH schedules one of a PDSCH for reception in a first sub-band within a BWP or an uplink scheduling grant of a PUSCH for transmission in a second sub-band within the BWP (e.g., the scheduling offset process component 1340 and/or the reception component 1330). The apparatus 1302 includes means for determining one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a PUCCH is used to schedule the PUSCH (e.g., the slot determination component 1342, the reception component 1330, and/or the transmission component 1334). The apparatus 1302 includes means for transmitting information to the base station indicating analog beamforming weights, the analog beamforming weights being based on an analog beamforming codebook, wherein the analog beamforming codebook is specific to the first sub-band or the second sub-band (e.g., the slot beamforming weights determination component 1344 and/or the transmission component 1334).

In one configuration, the slot for receiving the PDSCH is based on the first sub-band within the BWP and on $K_0$ for the first sub-band within the BWP, the slot for receiving the PDSCH being slot $n+K_0$, where n is the slot in which the PDCCH is received and $K_0$ is a slot scheduling offset for the PDSCH, or the slot for transmitting the PUSCH is based on the second sub-band within the BWP is based on $K_2$ for the second sub-band within the BWP, the slot for transmitting the PUSCH being slot $n+K_2$, where n is the slot in which the PUCCH is transmitted and $K_2$ is a slot scheduling offset for the PUSCH. In one example, $K_0$ may be different for at least two different sub-bands within the same BWP. Similarly, $K_2$ may be different for at least two different sub-bands within the same BWP.

In another configuration, the scheduling offset parameter is determined based on the first sub-band or the second sub-band, and the first sub-band or the second sub-band being a channel within a channelized frequency band.

In another configuration, the apparatus 1302 includes means for receiving, in response to the transmitted information, information indicating one of the $K_0$ or the $K_2$.

In another configuration, the PDCCH is on a first CC, the PDSCH is on a second CC, the PUCCH is on a third CC, and the PUSCH is on a fourth CC, where the first CC being different than the second, the third, or the fourth CC. The slot for receiving the PDSCH may be determined further based on the second CC, and the slots for transmitting the PUCCH and the PUSCH may be determined further based on the third and the fourth CCs, the first sub-band being based on the second CC and the second sub-band being based on the third and the fourth CCs.

In another configuration, a time duration for QCL parameter for receiving the PDSCH within the BWP may be based on the second CC, and for transmitting the PUCCH and the PUSCH within the BWP may be based on the third and the fourth CCs.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
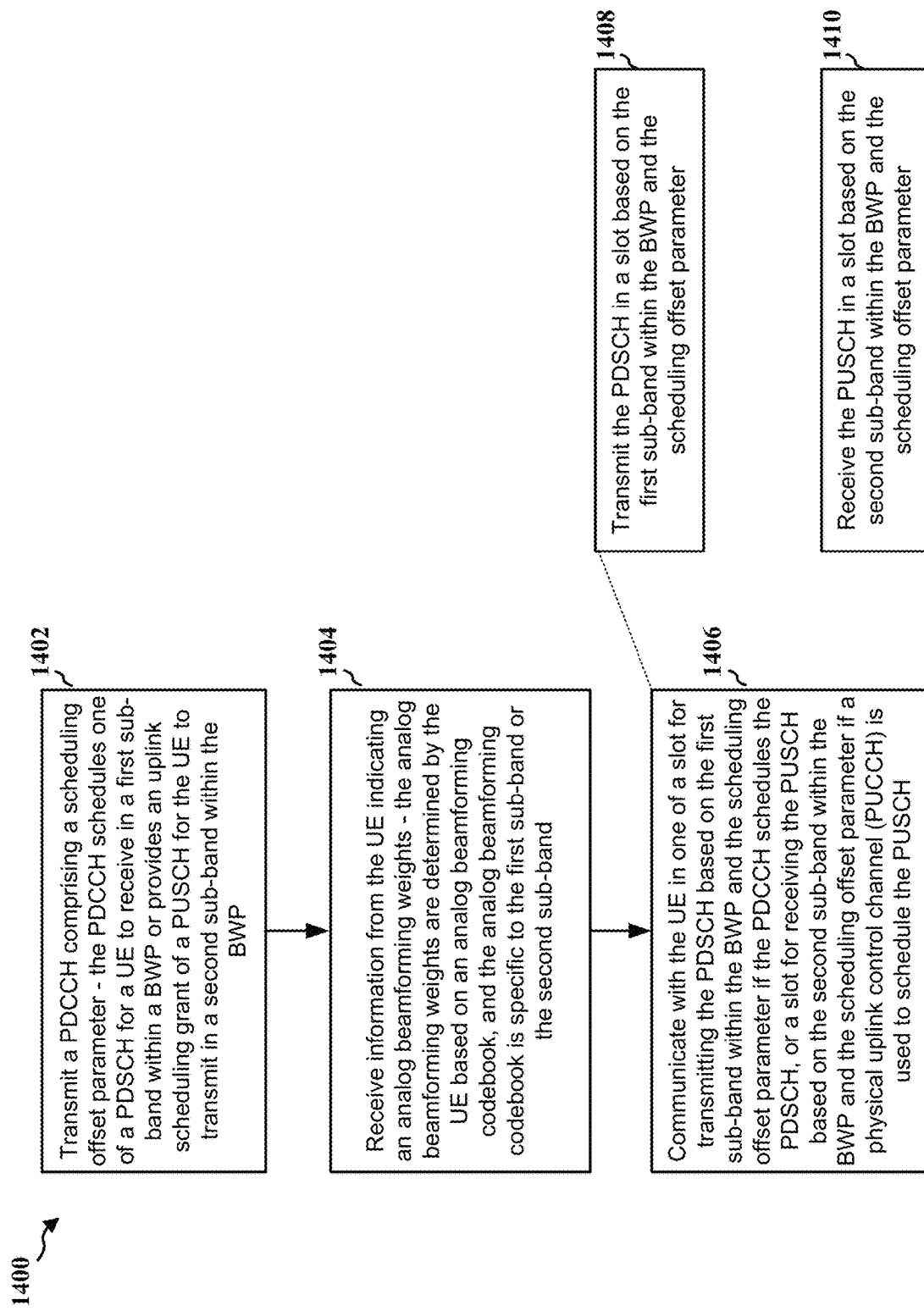
FIG. 14 is a flowchart of a method of wireless communication.

FIG. 14 is a flowchart 1400 of a method of wireless communication. The method may be performed by a base station or a component of a base station (e.g., base station 102, 180, 310, 1104; the apparatus 1502; which may include the memory 376 and which may be the entire base station 310 or a component of the base station 310, such as the TX processor 316, the RX processor 370, and/or the controller/processor 375). The method may enable the base station to schedule an offset for a UE to receive the PDSCH or for transmitting the PUCCH and the PUSCH. The offset may be based on a sub-band within a BWP or based on one or more channel within a channelized frequency band.

At 1402, the base station may transmit a PDCCH including a scheduling offset parameter, where the PDCCH may schedule one of a PDSCH for a UE to receive in a first sub-band within a BWP or an uplink scheduling grant of a PUSCH for the UE to transmit in a second sub-band within the BWP, such as described in connection with FIGS. 4, 5, 8, and 11. For example, at 1110, the base station 1104 may transmit a PDCCH 1106 with a scheduling offset parameter 1108 to the UE 1102. The transmission of the PDCCH including the scheduling offset parameter may be performed by, e.g., the scheduling component 1540 and/or the transmission component 1534 of the apparatus 1502 in FIG. 15.

At 1404, the base station may receive information from the UE indicating an analog beamforming weights, where the analog beamforming weights may be determined by the UE based on an analog beamforming codebook, and the analog beamforming codebook is specific to the first sub-band or the second sub-band, such as described in connection with FIGS. 10A, 10B, and 11. For example, at 1118, the base station 1104 may receive a determined analog beamforming weights from the UE 1102. In response, the base station may transmit an indication of one of the $K_0$ or the $K_2$. The reception of information indicating the analog beamforming weights may be performed by, e.g., the beamforming weights process component 1542 and/or the reception component 1530 of the apparatus 1502 in FIG. 15.

At 1406, the base station may communicate with the UE in one of a slot for transmitting the PDSCH based on the first sub-band within the BWP and the scheduling offset parameter if the PDCCH schedules the PDSCH (e.g., as shown at 1408), or a slot for receiving the PUSCH based on the second sub-band within the BWP and the scheduling offset parameter if a PUCCH is used to schedule the PUSCH (e.g., as shown at 1410), such as described in connection with FIG. 11. For example, at 1117, the base station 1104 may receive a PUSCH from the UE 1102 or transmit a PDSCH to the UE 1102 based on the first sub-band or the second sub-band. The communication may be performed by, e.g., the communication processor 1544, the transmission component 1534, and/or the reception component 1530 of the apparatus 1502 in FIG. 15.

In one example, the base station may configure the PDCCH to be on a first CC, the PDSCH to be on a second CC, the PUCCH to be on a third CC, and the PUSCH to be on a fourth CC, where the first CC may be different than the second, the third, or the fourth CC. Note that the use of "first," "second," "third" and "fourth" does not specify a particular temporal order and merely indicates different CCs, such as described in connection with FIG. 9. The UE may determine the slot for receiving the PDSCH based on the second CC, and the UE may determine the slots for transmitting the PUCCH and the PUSCH based on the third and the fourth CCs, where the first sub-band may be based on the second CC and the second sub-band may be based on the third and the fourth CCs, etc. In one other example, the base station may configure a time duration for QCL parameter for the UE to receive the PDSCH within the BWP based on the second CC, and for the UE to transmit the PUCCH and the PUSCH within the BWP based on the third and the fourth CCs.

Figure 15:
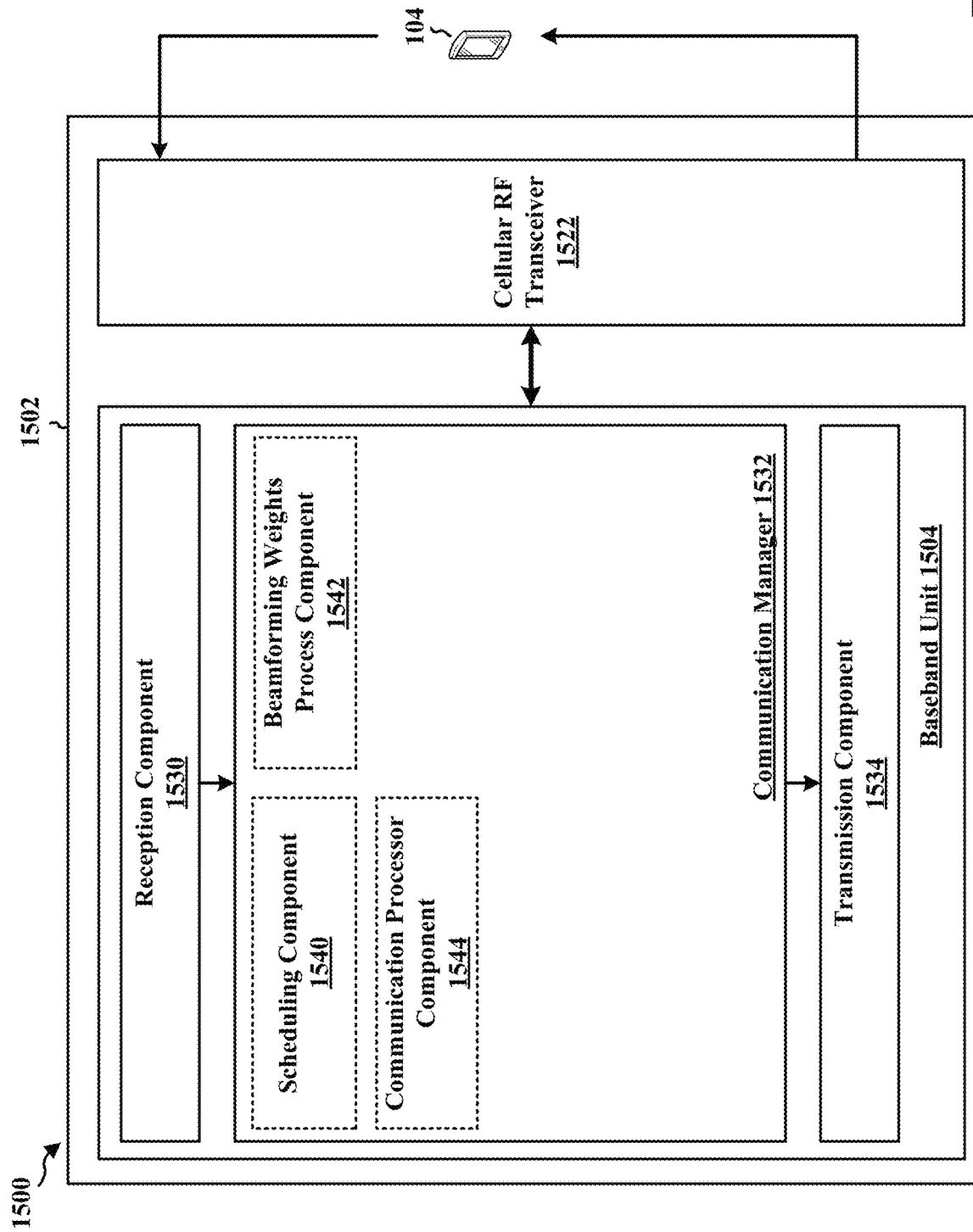
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a scheduling component 1540 that is configured to transmit a PDCCH including a scheduling offset parameter, where the PDCCH schedules one of a PDSCH for a UE to receive in a first sub-band within a BWP or an uplink scheduling grant of a PUSCH for the UE to transmit in a second sub-band within the BWP, and where the UE determines the one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a PUCCH is used to schedule the PUSCH, e.g., as described in connection with 1402 of FIG. 14. The communication manager 1532 includes a beamforming weights process component 1542 that is configured to receive information from the UE indicating an analog beamforming weights, where the analog beamforming weights are determined by the UE based on an analog beamforming codebook, and the analog beamforming codebook is specific to the first sub-band or the second sub-band, e.g., as described in connection with 1404 of FIG. 14. The communication manager 1532 includes a communication processor 1544 that is configured to communicate with the UE in one of a slot for transmitting the PDSCH based on the first sub-band within the BWP and the scheduling offset parameter if the PDCCH schedules the PDSCH, or a slot for receiving the PUSCH based on the second sub-band within the BWP and the scheduling offset parameter if a PUCCH is used to schedule the PUSCH, e.g., as described in connection with 1406 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for transmitting a PDCCH including a scheduling offset parameter, where the PDCCH schedules one of a PDSCH for a UE to receive in a first sub-band within a BWP or provides an uplink scheduling grant of a PUSCH for the UE to transmit in a second sub-band within the BWP (e.g., the scheduling component 1540 and/or the transmission component 1534). The apparatus 1502 includes means for communicating with the UE in one of a slot for transmitting the PDSCH based on the first sub-band within the BWP and the scheduling offset parameter if the PDCCH schedules the PDSCH, or a slot for receiving the PUSCH based on the second sub-band within the BWP and the scheduling offset parameter if a PUCCH is used to schedule the PUSCH (e.g., the communication processor 1544, the transmission component 1534, and/or the reception component 1530).

The apparatus 1502 includes means for receiving information from the UE indicating an analog beamforming weights (e.g., the beamforming weights process component 1542 and/or the reception component 1530). The analog beamforming weights may be determined by the UE based on an analog beamforming codebook, where the analog beamforming codebook may be specific to the first sub-band or the second sub-band. The apparatus 1502 includes means for transmitting, in response to the received information, an indication of one of the $K_0$ or the $K_2$.

In one configuration, the PDCCH is on a first CC, the PDSCH is on a second CC, the PUCCH is on a third CC, and the PUSCH is on a fourth CC, where the first CC may be different than the second, the third, or the fourth CC. The slot for transmitting the PDSCH may be based on the second CC, and the slots for receiving the PUCCH and the PUSCH may be based on the third and the fourth CCs, where the first sub-band may be based on the second CC and the second sub-band may be based on the third and the fourth CCs.

In another configuration, a time duration for QCL parameter for transmitting the PDSCH within the BWP may be based on the second CC, and for receiving the PUCCH and the PUSCH within the BWP may be based on the third and the fourth CCs.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive a PDCCH including a scheduling offset parameter, where the PDCCH schedules one of a PDSCH for reception in a first sub-band within a BWP or provides an uplink scheduling grant of a PUSCH for transmission in a second sub-band within the BWP; and communicate with a base station based on one of a slot for receiving the PDSCH based on the first sub-band within the BWP and the scheduling offset parameter when the PDCCH schedules the PDSCH, or a slot for transmitting the PUSCH based on the second sub-band within the BWP and the scheduling offset parameter when a PUCCH is used to schedule the PUSCH.

Aspect 2 is the apparatus of aspect 1, where the slot for receiving the PDSCH is based on the first sub-band within the BWP and on K0 for the first sub-band within the BWP, the slot for receiving the PDSCH being slot n+K0, where n is the slot in which the PDCCH is received and K0 is a slot scheduling offset for the PDSCH, or the slot for transmitting the PUSCH is based on the second sub-band within the BWP is based on K2 for the second sub-band within the BWP, the slot for transmitting the PUSCH being slot n+K2, where n is the slot in which the PUCCH is transmitted and K2 is a slot scheduling offset for the PUSCH.

Aspect 3 is the apparatus of any of aspects 1 and 2, where $K_0$ is different for at least two different sub-bands within the BWP.

Aspect 4 is the apparatus of any of aspects 1 to 3, where $K_2$ is different for at least two different sub-bands within the BWP.

Aspect 5 is the apparatus of any of aspects 1 to 4, where the scheduling offset parameter is determined based on the first sub-band or the second sub-band, and the first sub-band or the second sub-band being a channel within a channelized frequency band.

Aspect 6 is the apparatus of any of aspects 1 to 5, where the memory and the at least one processor is further configured to: transmit information to the base station indicating analog beamforming weights, the analog beamforming weights being based on an analog beamforming codebook, wherein the analog beamforming codebook is specific to the first sub-band or the second sub-band; and receive, in response to the transmitted information, an indication of one of the $K_0$ or the $K_2$.

Aspect 7 is the apparatus of any of aspects 1 to 6, where the PDCCH is on a first CC, the PDSCH is on a second CC, the PUCCH is on a third CC, and the PUSCH is on a fourth CC, the first CC being different than the second, the third, or the fourth CC.

Aspect 8 is the apparatus of any of aspects 1 to 7, where the slot for receiving the PDSCH is determined further based on the second CC, and the slots for transmitting the PUCCH and the PUSCH are determined further based on the third and the fourth CCs, the first sub-band being based on the second CC and the second sub-band being based on the third and the fourth CCs.

Aspect 9 is the apparatus of any of aspects 1 to 8, where a time duration for QCL parameter for receiving the PDSCH within the BWP is based on the second CC, and for transmitting the PUCCH and the PUSCH within the BWP is based on the third and the fourth CCs.

Aspect 10 is a method of wireless communication for implementing any of aspects 1 to 9.

Aspect 11 is an apparatus for wireless communication including means for implementing any of aspects 1 to 9.

Aspect 12 is a computer-readable medium storing computer executable code, where the code when executed by a processor causes the processor to implement any of aspects 1 to 9.

Aspect 13 is an apparatus for wireless communication including at least one processor coupled to a memory and configured to transmit a PDCCH including a scheduling offset parameter, where the PDCCH schedules one of a PDSCH for a UE to receive in a first sub-band within a BWP or provides an uplink scheduling grant of a PUSCH for the UE to transmit in a second sub-band within the BWP; and communicate with the UE in one of a slot for transmitting the PDSCH based on the first sub-band within the BWP and the scheduling offset parameter if the PDCCH schedules the PDSCH, or a slot for receiving the PUSCH based on the second sub-band within the BWP and the scheduling offset parameter if a PUCCH is used to schedule the PUSCH.

Aspect 14 is the apparatus of aspect 13, where the scheduling offset parameter is based on the first sub-band or the second sub-band, and the first sub-band or the second sub-band being a channel within a channelized frequency band.

Aspect 15 is the apparatus of any of aspects 13 and 14, where the memory and the at least one processor is further configured to: receive information from the UE indicating an analog beamforming weights, where the analog beamforming weights are determined by the UE based on an analog beamforming codebook, and the analog beamforming codebook is specific to the first sub-band or the second sub-band; and transmit, in response to the received information, an indication of one of a slot scheduling offset $K_0$ or a slot scheduling offset $K_2$.

Aspect 16 is the apparatus of any of aspects 13 to 15, where the PDCCH is on a first CC, the PDSCH is on a second CC, the PUCCH is on a third CC, and the PUSCH is on a fourth CC, the first CC being different than the second, the third, or the fourth CC.

Aspect 17 is the apparatus of any of aspects 13 to 16, where the slot for transmitting the PDSCH is further based on the second CC, and the slots for receiving the PUCCH and the PUSCH are further based on the third and the fourth CCs, the first sub-band being based on the second CC and the second sub-band being based on the third and the fourth CCs.

Aspect 18 is the apparatus of any of aspects 13 to 17, where a time duration for QCL parameter for transmitting the PDSCH within the BWP is based on the second CC, and for receiving the PUCCH and the PUSCH within the BWP is based on the third and the fourth CCs.

Aspect 19 is a method of wireless communication for implementing any of aspects 13 to 18.

Aspect 20 is an apparatus for wireless communication including means for implementing any of aspects 13 to 18.

Aspect 21 is a computer-readable medium storing computer executable code, where the code when executed by a processor causes the processor to implement any of aspects 13 to 18.

What is claimed is:

1. An apparatus for wireless communication at a user equipment (UE), comprising:
    memory; and
    at least one processor coupled to the memory, the memory and the at least one processor configured to:
        receive a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP; and communicate with a base station based on one of a first slot for receiving the PDSCH based on the first sub-band within the BWP and the scheduling offset parameter when the PDCCH schedules the PDSCH, or a second slot for transmitting the PUSCH based on the second sub-band within the BWP and the scheduling offset parameter when a physical uplink control channel (PUCCH) is used to schedule the PUSCH, wherein the first slot for receiving the PDSCH is slot $n+K_0$, where n corresponds to a slot in which the PDCCH is received and $K_0$ is a first slot scheduling offset for the PDSCH, or the second slot for transmitting the PUSCH is slot $n+K_2$, where n corresponds to a slot in which the PUCCH is transmitted and $K_2$ is a second slot scheduling offset for the PUSCH.

2. The apparatus of claim 1, wherein the $K_0$ is different for at least two different sub-bands within the BWP.

3. The apparatus of claim 1, wherein the $K_2$ is different for at least two different sub-bands within the BWP.

4. The apparatus of claim 1, wherein the scheduling offset parameter is determined based on the first sub-band or the second sub-band, and the first sub-band or the second sub-band being a channel within a channelized frequency band.

5. The apparatus of claim 1, wherein the memory and the at least one processor is further configured to:
transmit information to the base station indicating analog beamforming weights, the analog beamforming weights being based on an analog beamforming codebook, wherein the analog beamforming codebook is specific to the first sub-band or the second sub-band; and
receive, in response to the transmitted information, an indication of one of the $K_0$ or the $K_2$.

6. An apparatus for wireless communication at a user equipment (UE), comprising:
memory; and
at least one processor coupled to the memory, the memory and the at least one processor configured to:
receive a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP; and
communicate with a base station based on one of a first slot for receiving the PDSCH based on the first sub-band within the BWP and the scheduling offset parameter when the PDCCH schedules the PDSCH, or a second slot for transmitting the PUSCH based on the second sub-band within the BWP and the scheduling offset parameter when a physical uplink control channel (PUCCH) is used to schedule the PUSCH, wherein the PDCCH is on a first component carrier (CC), the PDSCH is on a second CC, the PUCCH is on a third CC, and the PUSCH is on a fourth CC, the first CC being different than the second CC, the third CC, or the fourth CC.

7. The apparatus of claim 6, wherein the first slot for receiving the PDSCH is determined further based on the second CC, and the second slot for transmitting the PUCCH and the PUSCH are determined further based on the third CC and the fourth CC, the first sub-band being based on the second CC and the second sub-band being based on the third CC and the fourth CC.

8. The apparatus of claim 6, wherein a time duration for QCL parameter for receiving the PDSCH within the BWP is based on the second CC, and for transmitting the PUCCH and the PUSCH within the BWP is based on the third CC and the fourth CC.

9. A method of wireless communication of a user equipment (UE), comprising:
receiving a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP; and
determining one of a first slot for receiving the PDSCH based on the first sub-band within the BWP and the scheduling offset parameter when the PDCCH schedules the PDSCH, or a second slot for transmitting the PUSCH based on the second sub-band within the BWP and the scheduling offset parameter when a physical uplink control channel (PUCCH) is used to schedule the PUSCH, wherein the first slot for receiving the PDSCH is slot $n+K_0$, where n corresponds to a slot in which the PDCCH is received and $K_0$ is a first slot scheduling offset for the PDSCH, or the second slot for transmitting the PUSCH is slot $n+K_2$, where n corresponds to a slot in which the PUCCH is transmitted and $K_2$ is a second slot scheduling offset for the PUSCH.

10. The method of claim 9, wherein the $K_0$ is different for at least two different sub-bands within the BWP.

11. The method of claim 9, wherein the $K_2$ is different for at least two different sub-bands within the BWP.

12. The method of claim 9, wherein the scheduling offset parameter is determined based on the first sub-band or the second sub-band, and the first sub-band or the second sub-band being a channel within a channelized frequency band.

13. The method of claim 9, further comprising:
transmitting information to a base station indicating analog beamforming weights, the analog beamforming weights being based on an analog beamforming codebook, wherein the analog beamforming codebook is specific to the first sub-band or the second sub-band; and
receiving, in response to the transmitted information, an indication of one of the $K_0$ or the $K_2$.

14. A method of wireless communication of a user equipment (UE), comprising:
receiving a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP; and
determining one of a first slot for receiving the PDSCH based on the first sub-band within the BWP and the scheduling offset parameter when the PDCCH schedules the PDSCH, or a second slot for transmitting the PUSCH based on the second sub-band within the BWP and the scheduling offset parameter when a physical uplink control channel (PUCCH) is used to schedule the PUSCH, wherein the PDCCH is on a first component carrier (CC), the PDSCH is on a second CC, the PUCCH is on a third CC, and the PUSCH is on a fourth CC, the first CC being different than the second CC, the third CC, or the fourth CC.

15. The method of claim 14, wherein the first slot for receiving the PDSCH is determined further based on the second CC, and the second slot for transmitting the PUCCH and the PUSCH are determined further based on the third CC and the fourth CC, the first sub-band being based on the second CC and the second sub-band being based on the third CC and the fourth CC.

16. The method of claim 14, wherein a time duration for QCL parameter for receiving the PDSCH within the BWP is based on the second CC, and for transmitting the PUCCH and the PUSCH within the BWP is based on the third CC and the fourth CC.

17. An apparatus for wireless communication at a base station, comprising:
    memory; and
    at least one processor coupled to the memory, the memory and the at least one processor configured to:
        transmit a physical downlink control channel (PDCCH) comprising a scheduling offset parameter, wherein the PDCCH schedules one of a physical downlink shared channel (PDSCH) for a UE to receive in a first sub-band within a bandwidth part (BWP) or provides an uplink scheduling grant of a physical uplink shared channel (PUSCH) for the UE to transmit in a second sub-band within the BWP; and
        communicate with the UE in one of a first slot for transmitting the PDSCH based on the first sub-band within the BWP and the scheduling offset parameter if the PDCCH schedules the PDSCH, or a second slot for receiving the PUSCH based on the second sub-band within the BWP and the scheduling offset parameter if a physical uplink control channel (PUCCH) is used to schedule the PUSCH, wherein the first sub-band and the second sub-band are channels within a channelized frequency band and the scheduling offset parameter is determined in a channel-specific manner.

18. The apparatus of claim 17, wherein the memory and the at least one processor is further configured to:
    receive information from the UE indicating an analog beamforming weights, wherein the analog beamforming weights are determined by the UE based on an analog beamforming codebook, and the analog beamforming codebook is specific to the first sub-band or the second sub-band; and
    transmit, in response to the received information, an indication of one of a slot scheduling offset $K_0$ or a slot scheduling offset $K_2$.

19. An apparatus for wireless communication at a base station, comprising:
    memory; and
    at least one processor coupled to the memory, the memory and the at least one processor configured to:
        transmit a physical downlink control channel (PDCCH) comprising a scheduling offset parameter, wherein the PDCCH schedules one of a physical downlink shared channel (PDSCH) for a UE to receive in a first sub-band within a bandwidth part (BWP) or provides an uplink scheduling grant of a physical uplink shared channel (PUSCH) for the UE to transmit in a second sub-band within the BWP; and
        communicate with the UE in one of a first slot for transmitting the PDSCH based on the first sub-band within the BWP and the scheduling offset parameter if the PDCCH schedules the PDSCH, or a second slot for receiving the PUSCH based on the second sub-band within the BWP and the scheduling offset parameter if a physical uplink control channel (PUCCH) is used to schedule the PUSCH, wherein the PDCCH is on a first component carrier (CC), the PDSCH is on a second CC, the PUCCH is on a third CC, and the PUSCH is on a fourth CC, the first CC being different than the second CC, the third CC, or the fourth CC.

20. The apparatus of claim 19, wherein the first slot for transmitting the PDSCH is determined further based on the second CC, and the second slot for receiving the PUCCH and the PUSCH are determined further based on the third CC and the fourth CC, the first sub-band being based on the second CC and the second sub-band being based on the third CC and the fourth CC.

21. The apparatus of claim 19, wherein a time duration for QCL parameter for transmitting the PDSCH within the BWP is based on the second CC, and for receiving the PUCCH and the PUSCH within the BWP is based on the third CC and the fourth CC.

22. A method of wireless communication at a base station, comprising:
    transmitting a physical downlink control channel (PDCCH) comprising a scheduling offset parameter, wherein the PDCCH schedules one of a physical downlink shared channel (PDSCH) for a UE to receive in a first sub-band within a bandwidth part (BWP) or provides an uplink scheduling grant of a physical uplink shared channel (PUSCH) for the UE to transmit in a second sub-band within the BWP; and
    communicating with the UE in one ofa first slot for transmitting the PDSCH based on the first sub-band within the BWP and the scheduling offset parameter if the PDCCH schedules the PDSCH, or a second slot for receiving the PUSCH based on the second sub-band within the BWP and the scheduling offset parameter if a physical uplink control channel (PUCCH) is used to schedule the PUSCH, wherein the first sub-band and the second sub-band are channels within a channelized frequency band and the scheduling offset parameter is determined in a channel-specific manner.

23. The method of claim 22, further comprising:
    receiving information from the UE indicating an analog beamforming weights, wherein the analog beamforming weights are determined by the UE based on an analog beamforming codebook, and the analog beamforming codebook is specific to the first sub-band or the second sub-band; and
    transmitting, in response to the received information, an indication of one of a slot scheduling offset $K_0$ or a slot scheduling offset $K_2$.

24. A method of wireless communication at a base station, comprising:
    transmitting a physical downlink control channel (PDCCH) comprising a scheduling offset parameter, wherein the PDCCH schedules one of a physical downlink shared channel (PDSCH) for a UE to receive in a first sub-band within a bandwidth part (BWP) or provides an uplink scheduling grant of a physical uplink shared channel (PUSCH) for the UE to transmit in a second sub-band within the BWP; and communicating with the UE in one of a first slot for transmitting the PDSCH based on the first sub-band within the BWP and the scheduling offset parameter if the PDCCH schedules the PDSCH, or a second slot for receiving the PUSCH based on the second sub-band within the BWP and the scheduling offset parameter if a physical uplink control channel (PUCCH) is used to schedule the PUSCH, wherein the PDCCH is on a first component carrier (CC), the PDSCH is on a second CC, the PUCCH is on a third CC, and the PUSCH is on a fourth CC, the first CC being different than the second CC, the third CC, or the fourth CC.

25. The method of claim 24, wherein the first slot for transmitting the PDSCH is determined further based on the second CC, and the second slot for receiving the PUCCH and the PUSCH are determined further based on the third CC and the fourth CC, the first sub-band being based on the second CC and the second sub-band being based on the third CC and the fourth CC.

26. The method of claim 24, wherein a time duration for QCL parameter for transmitting the PDSCH within the BWP is based on the second CC, and for receiving the PUCCH and the PUSCH within the BWP is based on the third CC and the fourth CC.

27. An apparatus for wireless communication at a user equipment (UE), comprising:
  memory; and
  at least one processor coupled to the memory, the memory and the at least one processor configured to:
    receive a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP; and
    communicate with a base station based on one of a first slot for receiving the PDSCH based on the first sub-band within the BWP and the scheduling offset parameter when the PDCCH schedules the PDSCH, or a second slot for transmitting the PUSCH based on the second sub-band within the BWP and the scheduling offset parameter when a physical uplink control channel (PUCCH) is used to schedule the PUSCH, wherein the first sub-band and the second sub-band are channels within a channelized frequency band and the scheduling offset parameter is determined in a channel-specific manner.

28. A method of wireless communication of a user equipment (UE), comprising:
  receiving a physical downlink control channel (PDCCH) comprising a scheduling offset parameter, wherein the PDCCH schedules one of a physical downlink shared channel (PDSCH) for reception in a first sub-band within a bandwidth part (BWP) or provides an uplink scheduling grant of a physical uplink shared channel (PUSCH) for transmission in a second sub-band within the BWP; and
  determining one of a first slot for receiving the PDSCH based on the first sub-band within the BWP and the scheduling offset parameter when the PDCCH schedules the PDSCH, or a second slot for transmitting the PUSCH based on the second sub-band within the BWP and the scheduling offset parameter when a physical uplink control channel (PUCCH) is used to schedule the PUSCH, wherein the first sub-band and the second sub-band are channels within a channelized frequency band and the scheduling offset parameter is determined in a channel-specific manner.

* * * * *